(12) United States Patent
Lu et al.

(10) Patent No.: US 8,089,590 B2
(45) Date of Patent: Jan. 3, 2012

(54) TRANSFLECTIVE LIQUID CRYSTAL DISPLAY

(75) Inventors: Ruibo Lu, Orlando, FL (US); Shin-Tson Wu, Orlando, FL (US); Wang-Yang Li, Xinhua Town, Tainan County (TW); Chung-Kuang Wei, Taipei (TW)

(73) Assignees: Chimei Innolux Corporation, Miaoli County (TW); University of Central Florida Research Foundation, Inc., Orlando, FL (US)

( * ) Notice: Subject to any disclaimer, the term of this patent is extended or adjusted under 35 U.S.C. 154(b) by 767 days.

(21) Appl. No.: 11/834,376

(22) Filed: Aug. 6, 2007

(65) Prior Publication Data

US 2009/0040432 A1 Feb. 12, 2009

(51) Int. Cl.
*G02F 1/1335* (2006.01)

(52) U.S. Cl. .......................... 349/114; 359/298

(58) Field of Classification Search .................... 349/56, 349/84, 139, 143, 144
See application file for complete search history.

(56) References Cited

U.S. PATENT DOCUMENTS

| | | | |
|---|---|---|---|
| 6,281,952 B1 | 8/2001 | Okamoto et al. | |
| 6,801,281 B2 * | 10/2004 | Huang et al. | 349/113 |
| 6,977,702 B2 | 12/2005 | Wu | |
| 7,015,997 B2 | 3/2006 | Choi et al. | |
| 7,072,015 B2 | 7/2006 | Maeda | |
| 7,072,096 B2 * | 7/2006 | Holman et al. | 359/298 |
| 7,088,409 B2 | 8/2006 | Itou et al. | |
| 7,230,663 B1 * | 6/2007 | Wu et al. | 349/114 |
| 7,280,174 B2 * | 10/2007 | Park et al. | 349/114 |
| 7,359,015 B1 * | 4/2008 | Wang et al. | 349/114 |
| 7,400,439 B2 * | 7/2008 | Holman | 359/298 |
| 2004/0218122 A1 * | 11/2004 | Nishimura | 349/114 |
| 2005/0018114 A1 * | 1/2005 | Park et al. | 349/114 |
| 2006/0152931 A1 * | 7/2006 | Holman | 362/297 |
| 2006/0215084 A1 * | 9/2006 | Roosendaal et al. | 349/114 |
| 2006/0244885 A1 * | 11/2006 | Lu et al. | 349/129 |
| 2006/0290853 A1 | 12/2006 | Hong et al. | |
| 2007/0216821 A1 * | 9/2007 | Kim et al. | 349/38 |
| 2007/0242014 A1 * | 10/2007 | Lee et al. | 345/88 |
| 2008/0002107 A1 * | 1/2008 | Mak et al. | 349/96 |
| 2008/0068314 A1 * | 3/2008 | Hsieh et al. | 345/87 |
| 2008/0165309 A1 * | 7/2008 | Ge et al. | 349/85 |

OTHER PUBLICATIONS

Hong et al. Extraordinarily high-contrast and wide-view liquid-crystal displays. Applied Physics Letters 86, 121107 s2005d.*
Zue et al. Transflective Liquid Crystal Displays. IEEE/OSA Journal of Display Technology, vol. 1, No. 1, Sep. 2005. p. 15.*
Hong et al. Designs of wide-view and broadband circular polarizers. Oct. 3, 2005 / vol. 13, No. 20 / Optics Express 8318.*

(Continued)

*Primary Examiner* — Brian M. Healy
*Assistant Examiner* — Peter Radkowski
(74) *Attorney, Agent, or Firm* — Fish & Richardson P.C.

(57) ABSTRACT

A transflective display includes pixels each including a reflective (R) sub-pixel, a transmissive (T) sub-pixel, and electrodes having features to cause multiple domains to form in a liquid crystal layer of the R sub-pixel and the T sub-pixel. The electrodes in the R sub-pixels have features that are different from features of the electrodes in the T sub-pixel to cause the liquid crystal layer in the R sub-pixel to have an optical phase retardation that is between 20% to 80% of an optical phase retardation of the liquid crystal layer in the T sub-pixel. The R sub-pixel and the T sub-pixel have substantially the same cell gap and are driven by the same pixel voltage.

31 Claims, 36 Drawing Sheets

OTHER PUBLICATIONS

Lin et al. Tunable-Focus Cylindrical Liquid Crystal Lenses. Japanese Journal of Applied Physics vol. 44, No. 1A, 2005, pp. 243-244.*

West et al. Fast birefringent mode stressed liquid crystal. Applied Physics Letters 86, 031111 s2005d.*

West et al. Stressed liquid crystals and their application. Liquid Crystals IX, edited by Iam-Choon Khoo, Proceedings of SPIE vol. 5936. 2005.*

Zhang et al. Fast multi-spectral liquid-crystal-on-silicon spatial light modulators. Technologies for Synthetic Environments: Hardware-in-the-Loop Testing XI, edited by Robert Lee Murrer, Jr., Proc. of SPIE vol. 6208.*

Zue et al. Transflective Liquid Crystal Displays. IEEE/OSA Journal of Display Technology, vol. 1, No. 1, Sep. 2005. p. 15.*

Lin et al. Tunable-Focus Cylindrical Liquid Crystal Lenses. Japanese Journal of Applied Physics vol. 44, No. 1A, 2005, pp. 243-244.*

West et al. Fast birefringent mode stressed liquid crystal. Applied Physics Letters 86, 031111 s2005d.*

Zhang et al. Fast multi-spectral liquid-crystal-on-silicon spatial light modulators. Technologies for Synthetic Environments: Hardware-in-the-Loop Testing XI, edited by Robert Lee Murrer, Jr., Proc. of SPIE vol. 6208.*

S. H. Lee et al, "A Novel Transflective Liquid Crystal Display with a Periodically Patterned Electrode," Japanese Journal of Applied Physics, vol. 42, pp. L1455-L1458 (2003).

S. T. Wu and D. K. Yang, Reflective Liquid Crystal Displays (Wiley, Chichester, 2001); Chap. 12.

Lu et al., "Ultra Wide-View Liquid Crystal Displays", J. Display Tech., vol. 1, No. 1, pp. 3-14 (Sep. 2006).

Wu, S. T. and Wu, C. S., "Mixed-mode twisted nematic liquid crystal cells for reflective displays", Appl. Phys. Lett., vol. 68, pp. 1455-1457 (1996).

* cited by examiner

TRANSFLECTIVE LIQUID CRYSTAL DISPLAY

At least some of the subject matter disclosed in this patent application was developed under a joint research agreement between Chi Mei Optoelectronics Corporation and the University of Central Florida.

BACKGROUND

This description relates to transflective liquid crystal displays.

A transflective type liquid crystal display (LCD) can operate in a transmissive mode and/or a reflective mode. In some examples, each pixel of the transflective LCD is divided into a transmissive part (T sub-pixel) and a reflective part (R sub-pixel). When operating in the transmissive mode, a backlight module generates light that is modulated by the T sub-pixels. When operating in the reflective mode, reflected ambient light is modulated by the R sub-pixels. In some examples, the T sub-pixel and the R sub-pixel share a common liquid crystal layer with a uniform cell gap. In some examples, the R sub-pixel has a cell gap that is different from the cell gap of the T sub-pixel.

SUMMARY

In one general aspect, a transflective liquid crystal display includes display pixels each including a reflective (R) sub-pixel, a transmissive (T) sub-pixel, and electrodes having features to cause multiple domains to form in a liquid crystal layer of the R sub-pixel and the T sub-pixel, the electrodes in the R sub-pixels having features that are different from features of the electrodes in the T sub-pixel to cause the liquid crystal layer in the R sub-pixel to have an optical phase retardation that is between 20% to 80% of an optical phase retardation of the liquid crystal layer in the T sub-pixel. The R sub-pixel and the T sub-pixel have a same cell gap and are driven by a same pixel voltage.

Implementations of the display may include one or more of the following features. The features of the electrodes include at least one of openings and protrusions. The features of the electrodes include elongated slits. The features of the electrodes include one or more openings that are formed on a common electrode of the R sub-pixel and one or more openings that are formed on a common electrode of the T sub-pixel. The features of the electrodes include one or more openings formed on a reflective electrode of the R sub-pixel and one or more openings formed on a pixel electrode of the T sub-pixel. The features of the electrodes include one or more openings in at least one electrode of the R sub-pixel and one or more openings in at least one electrode of the T sub-pixel, the openings in the R sub-pixel having an area that is of a first percentage of an area of the R sub-pixel, the openings in the T sub-pixel have an area that is of a second percentage of an area of the T sub-pixel, and the first percentage is greater than the second percentage.

The features of the electrodes include protrusions having triangular-shaped cross sections. The features of the electrodes include one or more protrusions in at least one electrode of the R sub-pixel and one or more protrusions in at least one electrode of the T sub-pixel. The one or more protrusions in the R sub-pixel have a base area that is of a first percentage of an area of the R sub-pixel, the one or more protrusions in the T sub-pixel have a base area that is of a second percentage of an area of the T sub-pixel, and the first percentage is greater than the second percentage.

The liquid crystal layer in the R sub-pixel has an optical phase retardation that is between 40% to 60% of the optical phase retardation of the liquid crystal layer in the T sub-pixel. In some examples, ambient light passes the liquid crystal layer of the R sub-pixel twice, and backlight passes the liquid crystal layer in the T sub-pixel once, such that the phase retardation imparted to the ambient light is 80% to 120% of the phase retardation imparted to the backlight. In some examples, ambient light passes the liquid crystal layer of the R sub-pixel twice, and backlight passes the liquid crystal layer in the T sub-pixel once, such that the phase retardation imparted to the ambient light is 40% to 160% of the phase retardation imparted to the backlight. The features of the electrodes are to increase a similarity level between voltage-transmittance characteristics and voltage-reflectance characteristics of the pixels, as compared to pixels using electrodes without the features.

In another general aspect, a transflective liquid crystal display includes pixels each including a reflective (R) sub-pixel having a liquid crystal layer between a common electrode and an at least partially reflective electrode, and a transmissive (T) sub-pixel having a liquid crystal layer between a common electrode and a transparent electrode. In the R sub-pixel, at least one of the common electrode and the at least partially reflective electrode have one or more openings to cause multiple domains to be formed in the liquid crystal layer of the R sub-pixel when a voltage is applied to the common electrode and the at least partially reflective electrode. In the T sub-pixel, at least one of the common electrode and the transparent electrode have one or more openings to cause multiple domains to be formed in the liquid crystal layer of the T sub-pixel when the voltage is applied to the common electrode and the reflective electrode. The openings affect electric field distributions in the R and T sub-pixels to cause the liquid crystal layer in the R sub-pixel to have an optical phase retardation that is between 20% to 80% of an optical phase retardation of the liquid crystal layer in the T sub-pixel.

Implementations of the display may include one or more of the following features. The openings in the R sub-pixel have an area that is of a first percentage of an area of the R sub-pixel, the openings in the T sub-pixel have an area that is of a second percentage of an area of the T sub-pixel, and the first percentage is greater than the second percentage. The first percentage is in a range between 10% to 80%. The second percentage is in arrange between 5% to 50%. In some examples, the second percentage is in a range between 30% to 70% of the first percentage. The openings are to increase a similarity level between voltage-transmittance characteristics and voltage-reflectance characteristics of the pixel, as compared to a pixel without the openings. At least one opening includes an elongated slit. The elongated slit has a widened portion having a width that is wider than other portions of the slit. Each opening causes a region to be formed in the pixel in which the region has a weaker electric field than adjacent regions.

The R sub-pixel includes at least two openings to cause at least three domains to be formed in the liquid crystal layer of the R sub-pixel when the voltage is applied to the common electrode and the at least partially reflective electrode. The T sub-pixel includes at least two openings to cause at least three domains to be formed in the liquid crystal layer of the T sub-pixel when the voltage is applied to the common electrode and the transparent electrode. In some examples, each of the common electrode and the at least partially reflective electrode of the R sub-pixel has at least one opening. In some examples, each of the common electrode and the transparent electrode of the T sub-pixel has at least one opening. The common electrode of the R sub-pixel is electrically connected to the common electrode of the T sub-pixel. The at least partially reflective electrode of the R sub-pixel is electrically connected to the transparent electrode of the T sub-pixel. In some examples, the at least partially reflective electrode includes a transflective electrode having a reflectance greater than 30% and a transmittance greater than 30%. The transflective electrode includes a metal grating having periodically spaced apart metal ribs. In some examples, the at least partially reflective electrode has a reflectivity greater than 70%.

The display includes a polarizer, for example, a circular polarizer. The display includes a compensation film, which, for example, includes at least one of an a-plate and a c-plate. In some examples, the compensation film includes a negative uniaxial birefringence film. In some examples, the compensation film includes a biaxial film. The display includes a first circular polarizer between the liquid crystal layer and a backlight module, a second circular polarizer in which the liquid crystal layer is between the first and second circular polarizers, a first a-plate compensation film between the first circular polarizer and the liquid crystal layer, a second a-plate compensation film between the second circular polarizer and the liquid crystal layer, and a c-plate compensation film between the second a-plate and the liquid crystal layer. The pixels are in dark states when no electric field is applied to the liquid crystal layer. The liquid crystal layer includes a liquid crystal material having a negative dielectric anisotropy. The liquid crystal layer includes chiral dopants. The liquid crystal layer of the R sub-pixel has a cell gap that is substantially the same as a cell gap of the liquid crystal layer of the T sub-pixel.

In another general aspect, a transflective liquid crystal display includes pixels each including a reflective (R) sub-pixel having a liquid crystal layer between a common electrode and an at least partially reflective electrode, and a transmissive (T) sub-pixel having a liquid crystal layer between a common electrode and a transparent electrode. In the R sub-pixel, at least one of the common electrode and the at least partially reflective electrode have one or more protrusions to cause multiple domains to be formed in the liquid crystal layer of the R sub-pixel when a voltage is applied to the common electrode and the at least partially reflective electrode. In the T sub-pixel, at least one of the common electrode and the transparent electrode have one or more protrusions to cause multiple domains to be formed in the liquid crystal layer of the T sub-pixel when the voltage is applied to the common electrode and the reflective electrode. The protrusions affect electric field distributions in the R and T sub pixels to cause the liquid crystal layer in the R sub-pixel to have an effective optical phase retardation that is between 20% to 80% of an effective optical phase retardation of the liquid crystal layer in the T sub-pixel.

Implementations of the display may include one or more of the following features. The protrusions are to increase a similarity level between voltage-transmittance characteristics and voltage-reflectance characteristics of the pixel, as compared to a pixel without the protrusions. The common electrode of the R sub-pixel is electrically connected to the common electrode of the T sub-pixel. The at least partially reflective electrode of the R sub-pixel is electrically connected to the transparent electrode of the T sub-pixel. In some examples, the at least partially reflective electrode includes a transflective electrode having a reflectance greater than 30% and a transmittance greater than 30%. The transflective electrode includes a metal grating having periodically spaced apart metal ribs. In some examples, the at least partially reflective electrode has a reflectivity greater than 70%. The display includes a polarizer, for example, a circular polarizer. The display includes a compensation film. In some examples, the compensation film includes at least one of an a-plate and a c-plate. In some examples, the compensation film includes an a-plate and a c-plate. The pixels are in dark states when no electric field is applied to the liquid crystal layer.

In other general aspect, at transflective liquid crystal display includes display pixels each including reflecting and transmitting sub-pixels having substantially the same cell gap and having respective different driving features that impart matching voltage-transmission and voltage-reflectance characteristics to the sub-pixels to permit a single gray-scale gamma curve to be used to drive the pixel in both a transmissive mode and a reflective mode. The different driving features include at least one of different opening ratios and different protrusion ratios.

In another general aspect, a transflective liquid crystal display includes display pixels each including two sub-pixels and electrodes having features to cause multiple domains to form in a liquid crystal layer of each of the two sub-pixels, the features of one of the two sub-pixels being different from the features of the other of the two sub-pixels to cause the liquid crystal layer in the one of the two sub-pixels to have an optical phase retardation that is between 20% to 80% of an optical phase retardation of the liquid crystal layer in the other of the two sub-pixels.

Implementations of the display may include the following feature. The two sub-pixels of the pixel are driven by the same pixel voltage.

In another general aspect, a transflective liquid crystal display includes display pixels each including a reflective (R) sub-pixel and a transmissive (T) sub-pixel and electrodes having features to cause multiple domains to form in a liquid crystal layer of each of the R and T sub-pixels. The features of electrodes of the R sub-pixel are different from the features of electrodes of the T sub-pixel to cause longitudinal electric fields and fringe electric fields to form in the R and T sub-pixels such that the R sub-pixel has a higher percentage of regions with fringe electric fields than that of the T sub-pixel.

Implementations of the display may include the following feature. The features of the electrodes include at least one of openings and protrusions.

In another general aspect, a method of operating a display includes driving a reflective (R) sub-pixel and a transmissive (T) sub-pixel of a pixel of a liquid crystal display using a common pixel voltage, the R sub-pixel and the T sub-pixel each having a liquid crystal layer, the R and T sub-pixels having a same cell gap. A first electric field is generated in the R sub-pixel to cause multiple domains to be formed in the liquid crystal layer of the R sub-pixel. A second electric field is generated in the T sub-pixel to cause multiple domains to be formed in the liquid crystal layer of the T sub-pixel. The first electric field has a distribution that is different from that of the second electric field to cause the liquid crystal layer in the R sub-pixel to have an optical phase retardation that is between 20% to 80% of an optical phase retardation of the liquid crystal layer in the T sub-pixel.

Implementations of the method may include one or more of the following features. Generating the first and second electric fields includes generating a second electric field that has a larger percentage of longitudinal field portions and a smaller percentage of fringe field portions than the first electric field. Generating the first and second electric fields includes generating the first and second electric fields to cause the liquid crystal layer in the R sub-pixel to have an effective optical phase retardation that is between 40% to 60% of the effective optical phase retardation of the liquid crystal layer in the T sub-pixel. In some examples, the method includes using differences between openings of one or more electrodes in the R sub-pixel and openings of one or more electrodes in the T sub-pixel to generate the differences in the first and second electric fields. In some examples, the method includes using differences between protrusions of one or more electrodes in the R sub-pixel and protrusions of one or more electrodes in the T sub-pixel to generate the differences in the first and second electric fields.

In another general aspect, a method of operating a display includes generating a first electric field in a liquid crystal layer of a reflective (R) sub-pixel of a pixel of a display, the first electric field having a longitudinal field portion and a fringe field portion. Multiple domains are formed in the liquid crystal layer of the R sub-pixel based on the longitudinal and fringe field portions of the first electric field to cause the liquid crystal layer of the R sub-pixel to have a first optical phase retardation. A second electric field is generated in a liquid crystal layer of a transmissive (T) sub-pixel of the pixel, the second electric field having a longitudinal field portion and a fringe field portion. Multiple domains are formed in the liquid crystal layer of the T sub-pixel based on the longitudinal and fringe field portions of the second electric field to cause the liquid crystal layer of the T sub-pixel to have a second optical phase retardation such that the first optical phase retardation is between 20% to 80% of the second optical phase retardation.

Implementations of the method may include one or more of the following features. Generating the first electric field includes applying a pixel voltage to a common electrode and an at least partially reflective electrode of the R sub-pixel. In some examples, at least one of the common electrode and the at least partially reflective electrode has one or more openings. In some examples, at least one of the common electrode and the at least partially reflective electrode has one or more protrusions. Generating the second electric field includes applying a pixel voltage to a common electrode and a transparent electrode of the T sub-pixel. At least one of the common electrode and the transparent electrode has one or more openings, or one or more protrusions.

The method includes imparting a phase retardation of λ/2 to ambient light modulated by the R sub-pixel when the ambient light passes the liquid crystal layer of the R sub-pixel twice. The method includes imparting a phase retardation of λ/2 to backlight modulated by the T sub-pixel when the backlight passes the liquid crystal layer of the T sub-pixel once. The method includes increasing a similarity level between voltage-transmittance characteristics and voltage-reflectance characteristics of the pixel, as compared to a pixel without the multiple domains. The method includes connecting the common electrodes to a ground reference voltage. The method includes connecting both the transparent electrode and the at least partially reflective electrode to a pixel voltage. The method includes generating polarized light and passing the polarized light through at least one of the R and T sub-pixels. The method includes increasing a viewing angle of the display by compensating variations in birefringence of the liquid crystal layer for light rays having different incidence angles. The method includes passing back light through a first circular polarizer, a first a-plate compensation film, the liquid crystal layer of the T sub-pixel, a c-plate compensation film, a second a-plate compensation film, and a second circular polarizer in sequence. The method includes forming a dark state in the pixel when no electric field is applied to the liquid crystal layer.

In another general aspect, a method of fabricating a display includes forming a transparent pixel electrode on a first substrate, and forming an at least partially reflective layer on a portion of the transparent pixel electrode, the at least partially reflective electrode corresponding to a reflective (R) sub-pixel, the portion of the transparent pixel electrode not covered by the at least partially reflective electrode corresponding to a transmissive (T) sub-pixel. A common electrode is formed on a second substrate, the common electrode having a first portion that corresponds to the at least partially reflective electrode and a second portion that corresponds to the transparent pixel electrode. One or more openings are formed in the first portion of the common electrode, the openings in the first portion having an area that is of a first percentage of an area of the first portion. One or more openings are formed in the second portion of the common electrode, the openings in the second portion having an area that is of a second percentage of an area of the second portion, the first percentage being greater than the second percentage by at least 5%. A liquid crystal layer is provided between the first and second substrates.

Implementations of the method may include one or more of the following features. The first percentage is in a range between 10% to 80%. The second percentage is in a range between 5% to 0.50%. In some examples, the second percentage is in a range between 30% to 70% of the first percentage.

In another general aspect, a method of fabricating a display includes forming a reflective (R) electrode and a common electrode of an R sub-pixel, and forming a transparent electrode and a common electrode of a transmissive (T), sub-pixel. Respective features are formed on the electrodes of the R and T sub-pixels to impart matching voltage-transmission and voltage-reflectance characteristics to the R and T sub-pixels to permit a single gray-scale gamma curve to be used to drive a pixel that includes the R and T sub-pixels in both a T mode and an R mode.

Implementations of the method may include one or more of the following features. In some examples, forming the respective features includes forming at least one opening in at least one electrode of the R sub-pixel and forming at least one opening in at least one electrode of the T sub-pixel, the at least one opening in the R sub-pixel having an area that is of a first percentage of an area of the R sub-pixel, the at least one opening in the T sub-pixel having an area that is of a second percentage of an area of the T sub-pixel, the first percentage being greater than the second percentage by at least 5%. In some examples, forming the respective features includes forming at least one protrusion in at least one electrode of the R sub-pixel and forming at least one protrusion in at least one electrode of the T sub-pixel, the at least one protrusion in the R sub-pixel having a base area that is of a first percentage of an area of the R sub-pixel, the at least one protrusion in the T sub-pixel having a base area that is of a second percentage of an area of the T sub-pixel, the first percentage being greater than the second percentage by at least 5%.

In another general aspect, a method of fabricating a display includes forming a transparent pixel electrode on a first substrate, and forming an at least partially reflective layer on a portion of the transparent pixel electrode, the at least partially reflective electrode corresponding to a reflective (R) sub-pixel, the portion of the transparent pixel electrode not covered by the at least partially reflective electrode corresponding to a transmissive (T) sub-pixel. A common electrode is formed on a second substrate, the common substrate having a first portion that corresponds to the at least partially reflective electrode and a second portion that corresponds to the transparent pixel electrode. One or more protrusions are formed on the first portion of the common electrode, the protrusions in the first portion having a base area that is of a first percentage of an area of the first portion. One or more protrusions are formed on the second portion of the common electrode, the protrusions in the second portion having a base area that is of a second percentage of an area of the second portion, the first percentage being greater than the second percentage by at least 5%. A liquid crystal layer is provided between the first and second substrates.

Implementations of the method may include one or more of the following features. The first percentage is in a range between 10% to 80%. The second percentage is in a range between 5% to 50%. In some examples, the second percentage is in a range between 30% to 70% of the first percentage.

Advantages of the transflective LCDs (which we also sometimes call, simply, transflective displays) described here can include one or more of the following. The transflective liquid crystal display can be used in various ambient conditions, and has a high light efficiency, a high contrast ratio, and a wide viewing angle. Because the displays include pixels that have voltage-transmission and voltage-reflectance characteristics that match closely, a single gray-scale gamma curve can be used to drive the display in both the transmissive mode and the reflective mode. A single TFT can be used to drive both the R sub-pixel and the T sub-pixel of a pixel. Because the pixels have liquid crystal cells having a single cell gap, they are easy to fabricate. The displays can be manufactured without a rubbing process for rubbing the alignment layers, allowing the displays to be manufactured with a high throughput. The transflective displays are useful in portable electronic devices.

DETAILED DESCRIPTION

Figure 1:
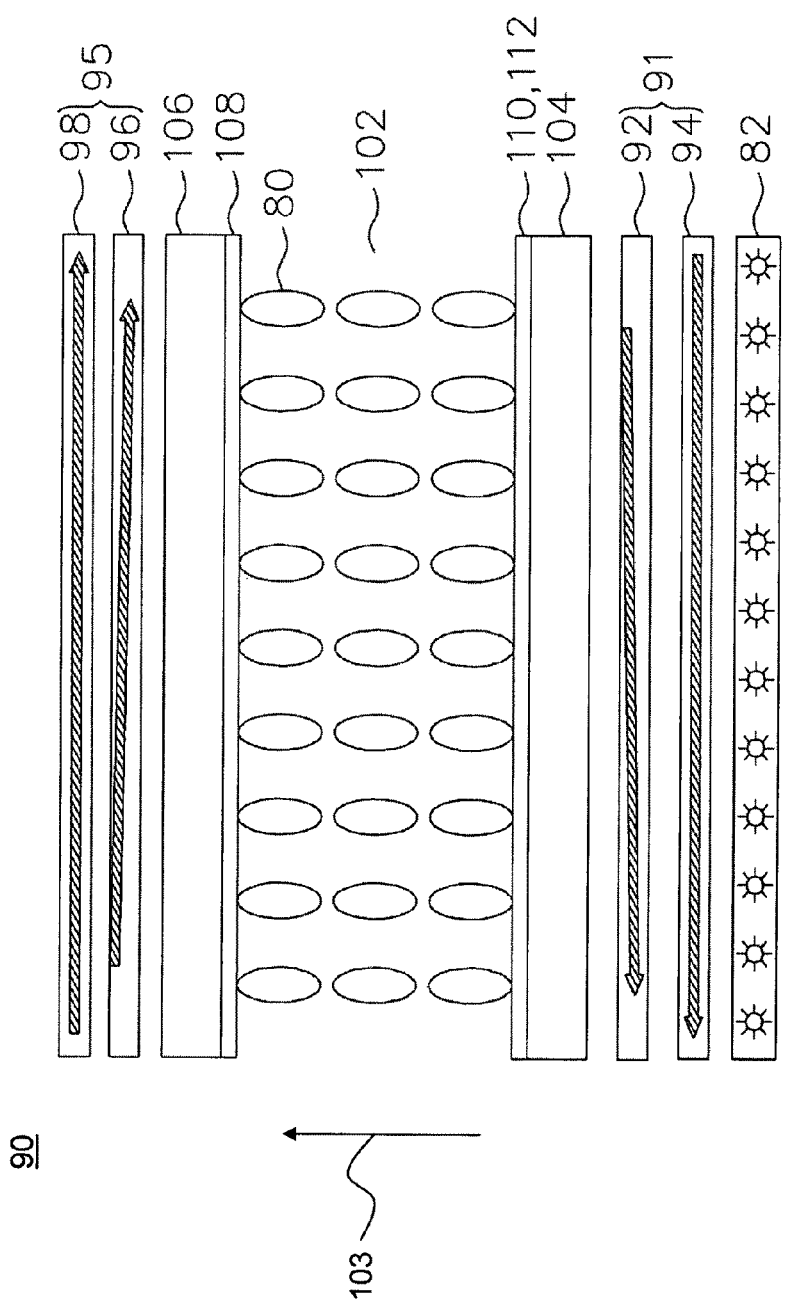
FIGS. 1 and 6 are cross-sectional diagrams of transflective liquid crystal displays.

FIG. 1 is a cross-sectional diagram of an example of a transflective liquid crystal display 90 having an array of pixels. Each pixel includes a reflective portion (referred to as the reflective sub-pixel or R sub-pixel) and a transmissive portion (referred to as the transmissive sub-pixel or T sub-pixel). Electrodes of the pixel are designed to cause the reflective portion to have an effective liquid crystal phase retardation smaller than (e.g., about half of) that of the transmissive portion. Ambient light modulated by the reflective portion experiences approximately the same amount of phase retardation as does back light modulated by the transmissive portion, so the reflective portion shows approximately the same gray scale level as the transmissive portion for a given pixel voltage. This allows the display 90 to show consistent gray scale levels (or colors) when switching between transmissive and reflective modes. Also, multiple domains are formed in the pixels to achieve a wide viewing angle.

The display 90 includes a liquid crystal layer 102 positioned between a lower substrate 104 and an upper substrate 106. The lower substrate 104 has transparent pixel electrodes 110 and reflective electrodes 112. The upper substrate 106 has a transparent common electrode 108. A first circular polarizer 91 is positioned at an outer side of the substrate 104. The first circular polarizer 91 can be formed by, e.g., a broadband quarter-wave film 92 and a linear polarizer 94. A second circular polarizer 95, which can be formed by a broadband quarter-wave film 96 and a linear polarizer 98, is positioned at an outer side of the substrate 106. A backlight module 82 provides back light.

In this description, the outer side refers to the side facing away from the liquid crystal layer 104, and the inner side refers to the side facing towards the liquid crystal layer 104. The terms "top," "bottom," "upper," "lower," "above," and "below" are used to describe relative positions of components of the display in the figures. The display can have other orientations so that in some circumstances, for example, what we call a lower layer may be above what we call an upper layer.

The liquid crystal layer 102 includes liquid crystal molecules 80 that are substantially aligned along a direction 103 normal to the surfaces of the substrates 104, 106 when no voltage is applied to the layer 102. The circular polarizers 91 and 95 are in, e.g., a crossed configuration such that the pixels are in a dark state when no voltage is applied to the pixels.

Below are examples of transflective pixels that each has an R sub-pixel and a T sub-pixel. For each example, a cross-sectional diagram of the structure of the pixel is provided, followed by simulations on the electric field distribution, distribution of liquid crystal directors, voltage-dependent transmittance curve, voltage-dependent reflectance curve, iso-contrast plot for the T sub-pixel, and the iso-contrast plot for the R sub-pixel when a pixel voltage is applied to the pixel. Other examples are also within the scope of the claims.

Example 1 of a Transflective Pixel

Figure 2:
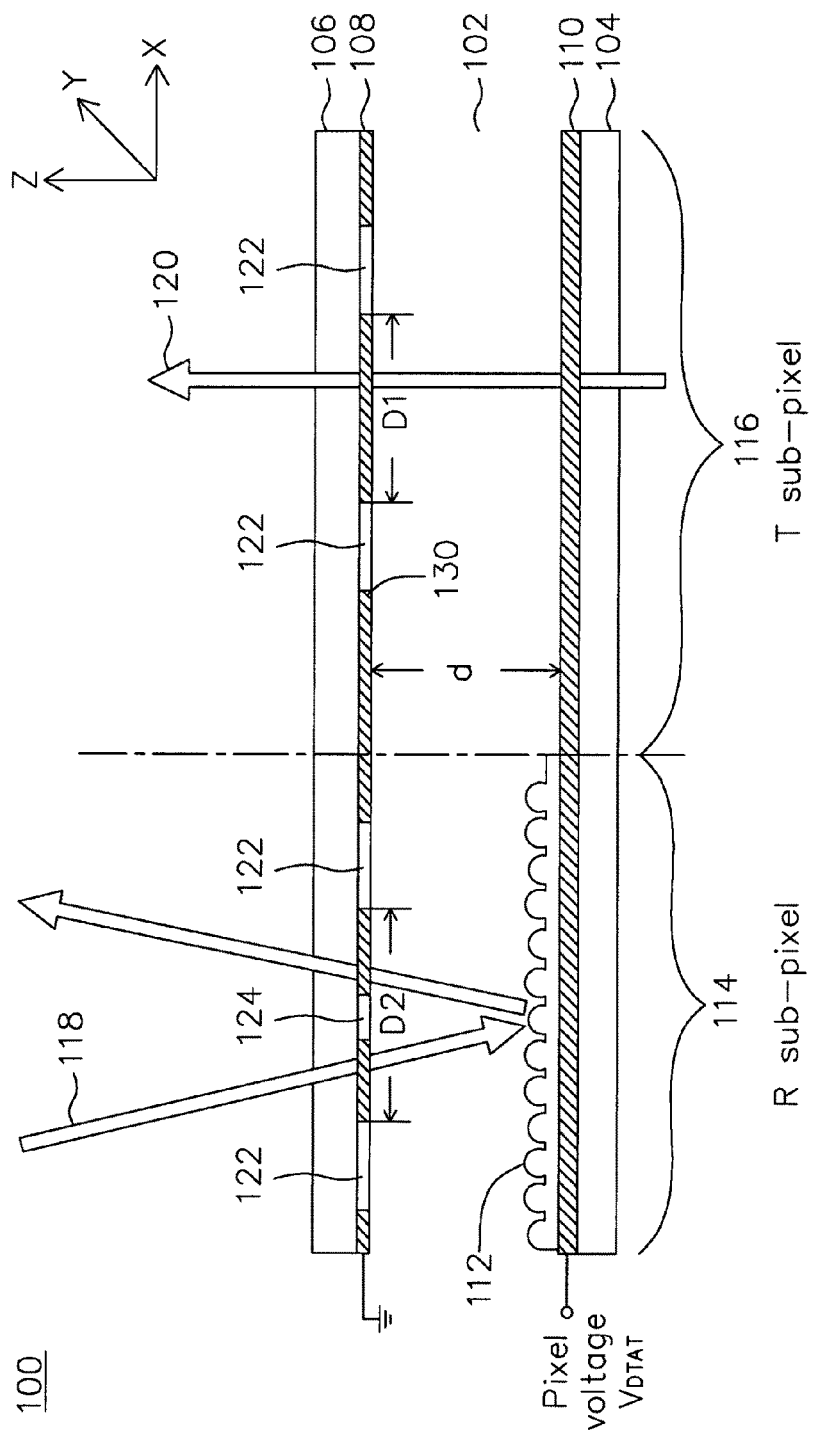
FIGS. 2, 9, 14, 20, 26, and 31 are cross-sectional diagrams of transflective pixels.

FIG. 2 is a cross-sectional diagram of an example of a transflective pixel 100 of the transflective liquid crystal display 90. The pixel 100 includes a conductive reflective electrode 112 that covers a portion (e.g., about half) of, and is electrically connected to, the transparent pixel electrode 110. The common electrode 108 and the pixel electrode 110 can be made of, e.g., indium-tin-oxide (ITO). The reflective electrode 112 can be, e.g., a bumpy aluminum layer having a thickness of about 100 nm. The reflective electrode 112 corresponds to a reflective (R) sub-pixel 114 that modulates ambient (or external) light 118 to allow a user to view images on the display 90 in outdoors or other bright light conditions. The portion of the pixel electrode 110 not covered by the reflective electrode 112 corresponds to a transmissive (T) sub-pixel 116 that modulates back light 120 and allows the user to view images using the back light 120 when the ambient light 118 is low. Because the reflective electrode 112 is thin, the thickness of the liquid crystal layer 102 is substantially the same for the R sub-pixel 114 and T sub-pixel 116.

During operation of the display 90, the common electrode 108 is connected to a ground reference voltage (e.g., 0V), and the pixel electrode 110 and the reflective electrode 112 are connected to a pixel voltage, $V_{DATA}$. Applying the pixel voltage $V_{DATA}$ to the electrodes 110 and 112 causes an electric field to be generated in the liquid crystal layer 102. The electrodes in the R sub-pixel 114 and the T sub-pixel 116 are designed to affect the distribution of the electric field in the liquid crystal layer 102 such that the layer 102 in the R sub-pixel 114 has an effective optical phase retardation smaller than (e.g., between 20% to 80%, or between 40% to 60%, of about 50% of) that of the liquid crystal layer 102 in the T sub-pixel 116. In some examples, the ambient light 118 modulated by the reflective electrode 112 experiences approximately the same aggregate amount of phase retardation when traveling round-trip in the liquid crystal layer 102 as does the back light 120 that passes the layer 102 once, so the R sub-pixel 114 shows approximately the same gray scale level as the T sub-pixel 116 for a given pixel voltage $V_{DATA}$.

The electric field distribution effected in the liquid crystal layer 102 can be determined using a number of methods. In some examples, the common electrode 108 includes openings 122 that cause fringe electric fields to be formed near the borders of the openings 122. The fringe electric fields cause the liquid crystal molecules 80 to tilt in different directions and cause multiple domains to be formed in the liquid crystal layer 102. The R sub-pixel 114 may have a larger percentage of openings and have a larger percentage of fringe electric fields than that of the T sub-pixel 116. This causes the R sub-pixel 114 to have a liquid crystal phase retardation lower than (e.g., between 20% to 80%, or between 40% to 60%, or about 50% of) that of the T sub-pixel 116. The openings 122 can be formed by, e.g., a photolithography process in which a portion of the electrode 108 is etched away.

To achieve a smaller effective liquid crystal phase retardation in the R sub-pixel 114, the number and shapes of the openings 122 are designed such that the R sub-pixel 114 has a higher opening ratio than the T sub-pixel 116 (e.g., 10% higher). For example, the number of openings 122 in the R sub-pixel 114 and/or the size of the openings 122 in the R sub-pixel 114 are higher than those of the T sub-pixel 116.

Figure 3:
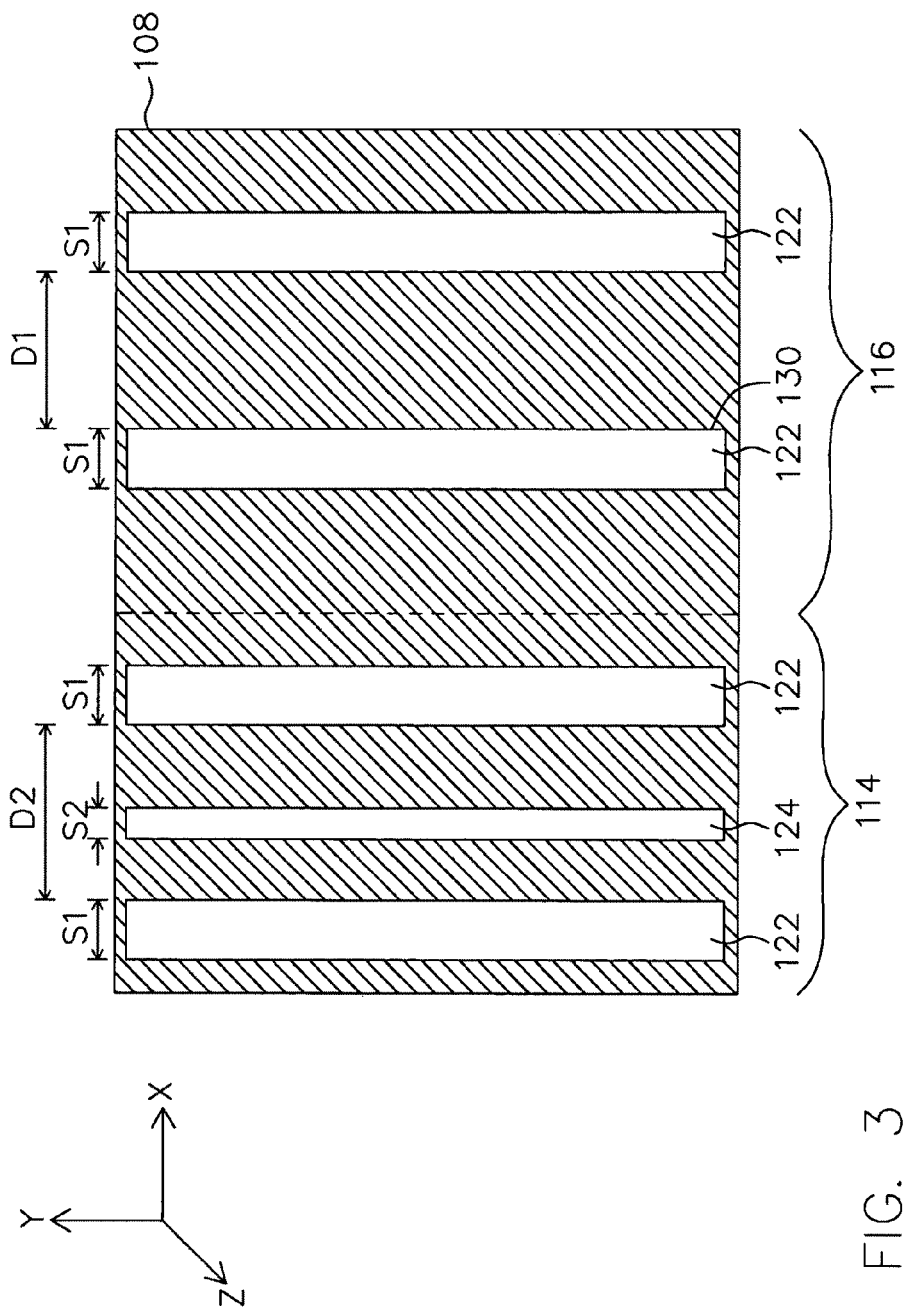
FIG. 3 is a top view of the common electrode.

FIG. 3 is a top view of an example of the common electrode 108. The openings 122 are rectangular-shaped slits each having a width S1. In some examples, the R sub-pixel 114 includes openings 124 between two openings 122 that are narrower to reduce (in some cases to eliminate) domain corruption. The opening 124 can be a rectangular-shaped slit having a width S2 that is less than S1. Domain corruption includes a situation in which the edges of two liquid crystal domains meet to form an irregular domain wall when an electric field is applied to the liquid crystal layer, the irregular domain wall adversely influencing the electro-optic properties of the pixel. In the T sub-pixel 116, the gap between the slits 122 is D1. In the R sub-pixel 114, the gap between the slits 122 is D2. The gaps D1 and D2 can be larger than the slit widths, S1 and S2.

A Cartesian coordinate system having x, y, and z axes is used as a reference for describing the orientations of the components of the display 90. In this example, the z-axis is perpendicular to the surfaces of the substrates 104 and 106. The x-axis and the y-axis are parallel to the surfaces of the substrates 104 and 106.

A parameter referred to as a "reflective opening ratio," ORr, is defined as an "effective slit projection area" of the R sub-pixel 114 divided by the area of the R sub-pixel 114. The effective slit projection area takes into account the openings in both the common electrode 108 and the reflective electrode 112 within the R sub-pixel 114.

Within the R sub-pixel 114, if there are slits (e.g., 122 and 124) in the common electrode 108 but no slits in the reflective electrode 112 (e.g., such as the pixel 100 of FIG. 2), the effective slit projection area is equal to the total area of the slits of the common electrode 108.

Within the R sub-pixel 114, if there are slits (e.g., 122a and 122b) in both the common electrode 108 and the reflective electrode 112 (e.g., pixel 280 of FIG. 20), and the openings (e.g., 122a) of the common electrode 108 are projected (hypothetically) onto the reflective electrode 112, then the sum of the areas of the slits (e.g., 122b) in the reflective electrode 112 and the projected areas that do not overlap the slits (e.g., 122b) is the effective slit projection area.

Similar to the reflective opening ratio, a parameter referred to as a "transmissive opening ratio," ORt, is defined as the effective slit projection area of the T sub-pixel 116 divided by the area of the T sub-pixel 116. Here, the effective slit projection area takes into account the openings in both the common electrode 108 and the pixel electrode 110 within the T sub-pixel 114.

Within the T sub-pixel 116, if there are slits (e.g., 122) in the common electrode 108 but no slits in the reflective electrode 112 (e.g., such as the pixel 100 of FIG. 2), the effective slit projection area is equal to the total area of the slits of the common electrode 108.

Within the T sub-pixel 116, if there are slits (e.g., 122a and 122b) in both the common electrode 108 and the pixel electrode 110 (e.g., pixel 280 of FIG. 20), and the slits (e.g., 122a) of the common electrode 108 are projected (hypothetically) onto the pixel electrode 110, then the sum of the areas of the slits (e.g., 122b) in the pixel electrode 110 and the projected areas that do not overlap the slits (e.g., 122b) is the effective slit projection area.

The reflective opening ratio ORr is designed to be larger than the transmissive opening ratio ORt. This causes the liquid crystal layer 102 in the R sub-pixel 114 to have an effective optical phase retardation that is, smaller than that of the liquid crystal layer 102 in the T sub-pixel 116.

When the pixel voltage $V_{DATA}$ is equal to 0 V, the liquid crystal molecules 80 in the layer 102 are aligned in a direction parallel to the z-axis. The vertical alignment of the liquid crystal molecules 80 are caused by alignment layers (not shown) on both sides of the liquid crystal layer 102. When a non-zero pixel voltage $V_{DATA}$ is applied to the electrodes 110 and 112, the electric field in the liquid crystal layer 102 causes the liquid crystal molecules 80 to tilt at an angle relative to the z-axis. By varying the pixel voltage level, the tilt angles of the liquid crystal molecules 80 can be varied, thereby generating different amounts of birefringence so that the pixel 100 can show different gray scale levels.

The effect of the openings 122 on the optical phase retardation of the liquid crystal layer 102 can be explained as follows.

Figure 4:
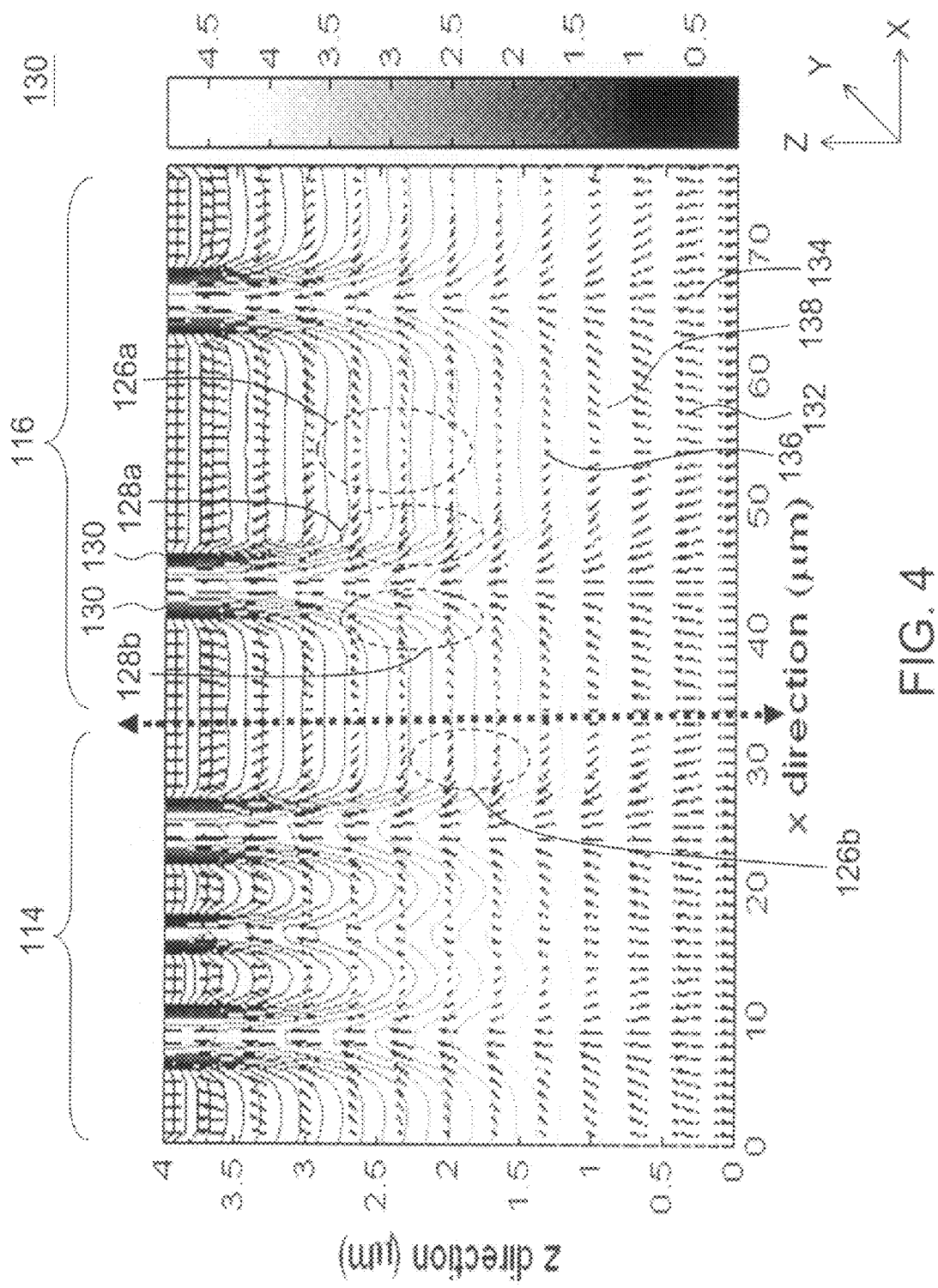
FIGS. 4, 10, 16, 22, 27, and 32 are graphs showing simulated electric potential lines and distributions of liquid crystal directors.

FIG. 4 is a graph 130 showing simulated electric potential lines 138 in the liquid crystal layer 102 and a distribution of liquid crystal directors 132 on an X-Z plane along the center of the pixel 100. In this example, a pixel voltage $V_{DATA}=5$ $V_{RMS}$ (root-mean-square voltage), which corresponds to a bright state or white color, is applied to the pixel electrode 110 and the reflective electrode 112. Each liquid crystal director 132 represents an average orientation of liquid crystal molecules 80 in a small, localized region. A director (e.g., 134) more parallel to the X-Z plane is shown to be longer than a director (e.g., 136) that is more perpendicular to the X-Z plane.

In the simulations for the pixel 100 of FIG. 2 (as well as for a pixel 180 of FIG. 9, a pixel 230 of FIG. 14, a pixel 280 of FIG. 20, a pixel 330 of FIG. 26, and a pixel 380 of FIG. 31), the liquid crystal layer 102 includes a negative dielectric anisotropic liquid crystal material MLC-6608, available from Merck, Germany, having a birefringence Δn=0.083 at λ=550 nm, a dielectric anisotropy Δ∈=−4.2, and a rotational viscosity $\gamma_1$=0.186 Pa·s. In the initial state, the liquid crystal molecules have azimuth angles approximately equal to 0° and pre-tilt angles approximately equal to 90°. The wavelength of the ambient or external light 118 and the back light 120 is set at $\lambda$=550 nm.

In the example of FIG. 2, the size of the pixel is approximately 76 μm×76 μm. The slit width, S1 is 4 μm, the slit width S2 is 2 μm, the slit gap D1 is 18 μm, the slit gap D2 is 12 μm, and the cell gap d is 4 μm. According to this configuration, the pixel 100 has a reflective opening ratio ORr=31% and a transmissive opening ratio Ort=18%. The reflective opening ratio is greater than the transmissive opening ratio.

The strength and direction of the electric field in the liquid crystal layer 102 is a function of location in the liquid crystal layer 102. The gradient of the electric potential lines 138 represent the direction of the electric field. Due to the openings 122 (and 124), the electric field in the liquid crystal layer 102 has a non-uniform distribution and includes longitudinal electric field portions (referred to as longitudinal electric fields) and fringe electric field portions (referred to as fringe electric fields). The longitudinal electric fields have electric field lines that are mostly parallel to the z-axis, and are located at regions (e.g., 126a, 126b) between the common electrode 108 and the pixel electrode 110, or between the common electrode 108 and the reflective electrode 112. The fringe electric fields have electric field lines that are at an angle to the z-axis, and are located at regions (e.g., 128a, 128b) that correspond to the borders 130 of the openings 122.

When a pixel voltage $V_{DATA}$ corresponding to a bright state or white color is applied to the electrodes 110, 112, the longitudinal electric fields cause the liquid crystal molecules 80 to rotate and achieve maximum liquid crystal retardation change. The thickness d of the liquid crystal layer 102 is selected such that the effective phase retardation (d·Δn)$_{eff}$≈$\lambda$/2 in the T sub-pixel 116 and (d·Δn)$_{eff}$≈$\lambda$/4 in the R sub-pixel 114, where Δn is the birefringence of the liquid crystal material and $\lambda$ is the wavelength of the incident ambient light 118 or back light 120.

In the R sub-pixel 114, the effective phase retardation is the phase retardation imparted to the ambient light 118 that is modulated by the liquid crystal layer 102 and reflected by the reflective electrode 112. In the T sub-pixel 116, the effective phase retardation is the phase retardation imparted to the backlight 120 that is modulated by the liquid crystal layer 102. The effective phase retardation in the R sub-pixel 114 and T sub-pixel 116 depend on the incidence angle and the pixel voltage applied across the liquid crystal layer 102. Examples of formulas for determining the effective phase retardation for certain pixel configurations are disclosed in "Ultrawide-View Liquid Crystal Displays" by Lu et al., Journal of Display Technology, vol. 1, no. 1, pages 3-14, September 2005, the content of which is incorporated by reference.

In some examples, the parameters of the display 90 can be designed partially by simulation. A particular liquid crystal material, a particular cell gap, and particular ambient and backlight conditions are selected. The slit widths S1 and S2, and the gap widths D1 and D2, are varied over a range of values to find values that cause the V-T curve to match the V-R curve more closely, and that (d·Δn)$_{eff}$≈$\lambda$/2 in the T sub-pixel 116 and (d·Δn)$_{eff}$≈$\lambda$/4 in the R sub-pixel 114 in the bright state.

As can be seen in the graph 130, the R sub-pixel 114 has a higher percentage of regions with fringe electric fields than the T sub-pixel 116. The pixel 100 has a reflective opening ratio ORr that is higher than the transmissive opening ratio ORt. As a result, the effective liquid crystal retardation of the R sub-pixel 114 is less than that of the T sub-pixel 116. The ratio of the effective liquid crystal retardation of the R sub-pixel 114 and T sub-pixel 116 can be tuned by adjusting the number and shape of the openings 122. For example, increasing the total area of the openings 122 in the R sub-pixel 114 increases the reflective opening ratio ORr and decreases the effective liquid crystal retardation of the R sub-pixel 114.

The fringe electric fields near the slit edges tilt the liquid crystal molecules 80 toward different directions, causing multiple domains to be formed in the pixel 100. For example, liquid crystal molecules 80 in the region 128a are rotated in a counter clockwise direction along the X-Z plane, whereas liquid crystal molecules 80 in the region 128b are rotated in a clockwise direction. Because the liquid crystal molecules 80 are oriented at multiple directions, light passing the liquid crystal layer 102 at different incidence angles experiences approximately the same phase retardation, and hence approximately the same gray scale level. This allows the display 90 to have a wide viewing angle.

The optical phase retardation of the liquid crystal layer 102 in the R sub-pixel 114 and the T sub-pixel 116 can be adjusted by varying the widths S1 and S2 and the gaps D1 and D2. Increasing the widths S1, S2 or reducing the gaps D1, D2 reduces the longitudinal electric fields, so the effective optical retardation is reduced. The openings 122, 124 are designed such that ORr>Ort to cause the effective liquid crystal retardation of the R sub-pixel 114 to be less than that of the T sub-pixel 116. For example, the effective liquid crystal retardation of the R sub-pixel 114 can be half of that of the T sub-pixel 116, so the ambient light 118 (which passes the liquid crystal layer 102 twice) modulated by the R sub-pixel 114 experiences approximately the same optical phase retardation as the back light 120 (which passes the layer 102 once) modulated by the T sub-pixel 116, resulting in substantially the same gray scale level in the R sub-pixel 114 and T sub-pixel 116.

Figure 5:
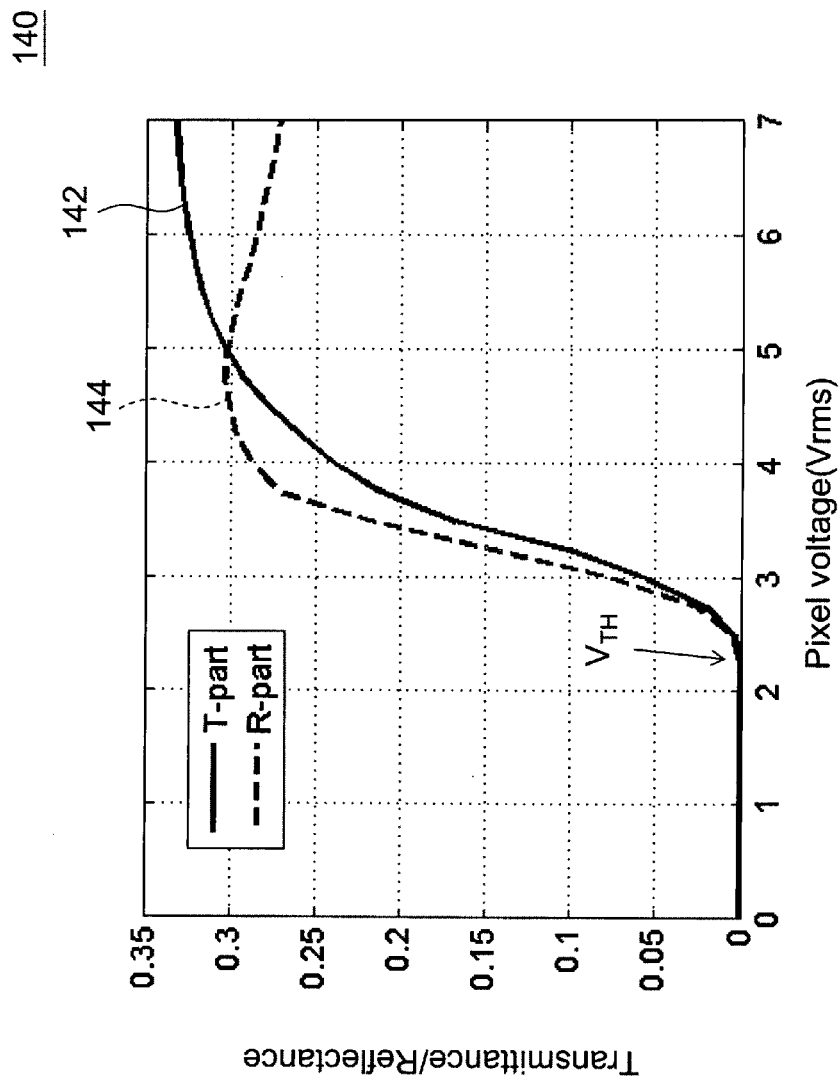
FIGS. 5, 11, 17, 23, 28, and 33 are graphs showing simulated data for voltage-dependent transmittance (V-T) curves and voltage-dependent reflectance (V-R) curves.

FIG. 5 is a graph 140 showing simulated data for a voltage-dependent transmittance (V-T) curve 142 and a voltage-dependent reflectance (V-R) curve 144 of the pixel 100 of FIG. 2. The wavelengths of the ambient light 118 and back light 120 are set at $\lambda$=550 nm. The graph 140 shows that the R sub-pixel 114 and the T sub-pixel 116 have the same threshold voltage $V_{TH}$=2.25 RMS. When the pixel voltage $V_{DATA}$ is below 5 $V_{RMS}$, the V-T curve 142 and the V-R curve 144 match more closely than a pixel having the reflective opening ratio equal to the transmissive opening ratio. The matching between the V-T curve 142 and V-R curve 144 indicates that both the T sub-pixel 116 and the R sub-pixel 114 of the transflective pixel 100 can be driven by a single thin film transistor.

The level of similarity between the V-T and V-R curves can be measured by, e.g., the root-mean-square (RMS) value of the differences between sampled normalized transmittance and reflectance values using the following equation:

$$\text{RMS difference} = \sqrt{\frac{\sum_{i=1}^{N}(T_i - R_i)^2}{N}}. \quad \text{(Equ. 1)}$$

Here, N is the number of sample points, Ti is the transmittance of a given voltage Vi, and Ri is the reflectance of the given voltage Vi. The lower the RMS difference, the greater the similarity between the V-T curve and the V-R curve. The normalization of the transmittance and reflectance is in reference to the maximum transmittance of the circular polarizers 91 and 95. For the V-T curve 142 and the V-R curve 144 in FIG. 5, by samplings N=256 voltage points between V=2.25 $V_{RMS}$. (corresponding to gray level 0) and V=5.0 $V_{RMS}$ (corresponding to gray level 255), the RMS difference between the V-R and V-T curves is about 4%.

When the pixel voltage is 5 $V_{RMS}$, the transmittance is about 30.2%, and the reflectance is about 30.1%. The pair of broadband circular polarizers 91, 95 has a maximum transmittance of 35%. Thus, the pixel 100 has a high optical efficiency of about 86% for both transmissive and reflective modes at 5 $V_{RMS}$ when normalized to the transmittance of the circular polarizers.

In the description below, for the simulations of the V-T and V-R curves for the pixel 100 of FIG. 2, pixel 180 of FIG. 9, pixel 230 of FIG. 14, pixel 280 of FIG. 20, pixel 330 of FIG. 26, and pixel 380 of FIG. 31, the transmittance and reflectance of the T sub-pixel and R sub-pixel were determined using the configuration shown in FIG. 1, in which crossed circular polarizers 91 and 95 are used. Compensation films were not used for the simulations of the V-T and V-R curves. The simulations do not take into account reflections at the surfaces of the polarizers, compensation films, and substrates.

In some examples, optical phase compensation films can be used to reduce light leakage at oblique angles of the pixel 100 to achieve a wide viewing angle. In general, the optical phase compensation films can be uniaxial or biaxial. Examples of compensation films are described in "Reflective Liquid Crystal Displays" by S. T. Wu and D. K. Yang, chapter 12, published by John Wiley & Sons, Ltd., the content of which is incorporated by reference. In some examples, wide-acceptance-angle circular polarizers can be used to increase viewing angle. Examples of wide-acceptance-angle circular polarizers are described in U.S. patent application 20060290853 "Wide-acceptance-angle circular polarizers," to Hong et al., the content of which is incorporated by reference.

Figure 6:
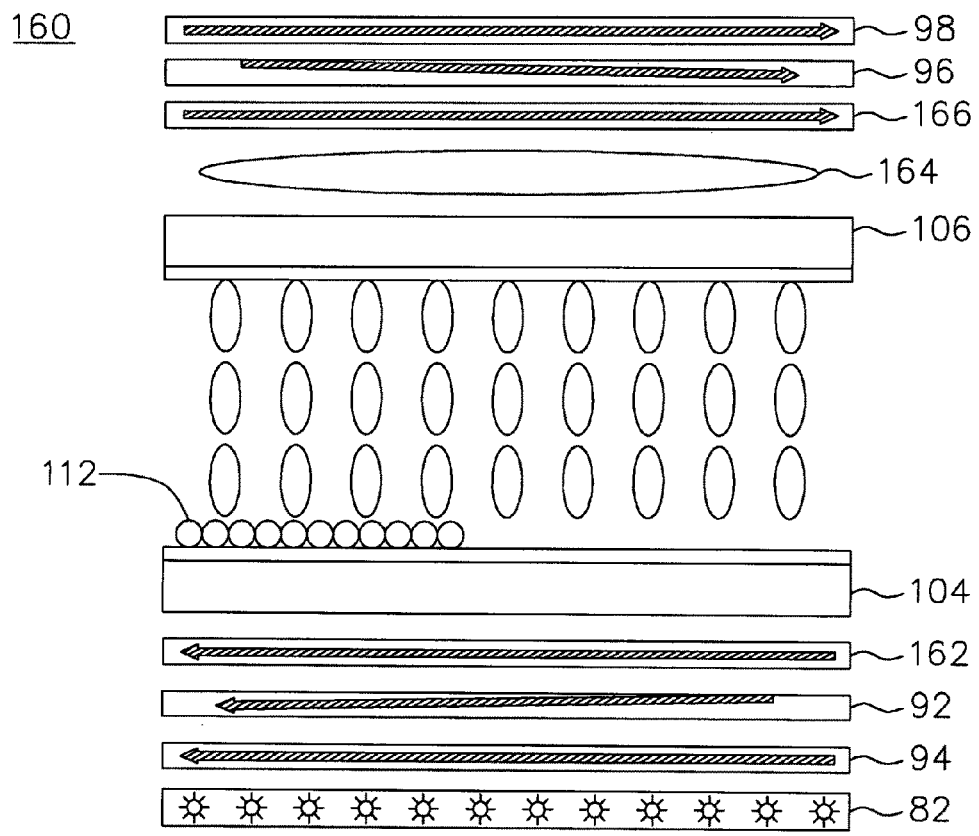

FIG. 6 is a cross sectional diagram of an example of a display 160 that is similar to the display 90 of FIG. 1 but includes additional compensation films. A first positive a-plate 162 is positioned between a lower substrate 104 and a lower broadband quarter-wave film 92. A negative c-plate 164 and a second positive a-plate 166 are positioned between an upper substrate 106 and an upper broadband quarter-wave film 96. For example, the first a-plate 162 has a retardation value d·Δn=5.5 nm, the second a-plate 166 has a retardation value d·Δn=13 nm, and the c-plate 164 has a retardation value d·Δn−127.5 nm. Similar to the display 90, the display 160 has an array of pixels each having an R sub-pixel 114 and a T sub-pixel 116.

Figure 7:
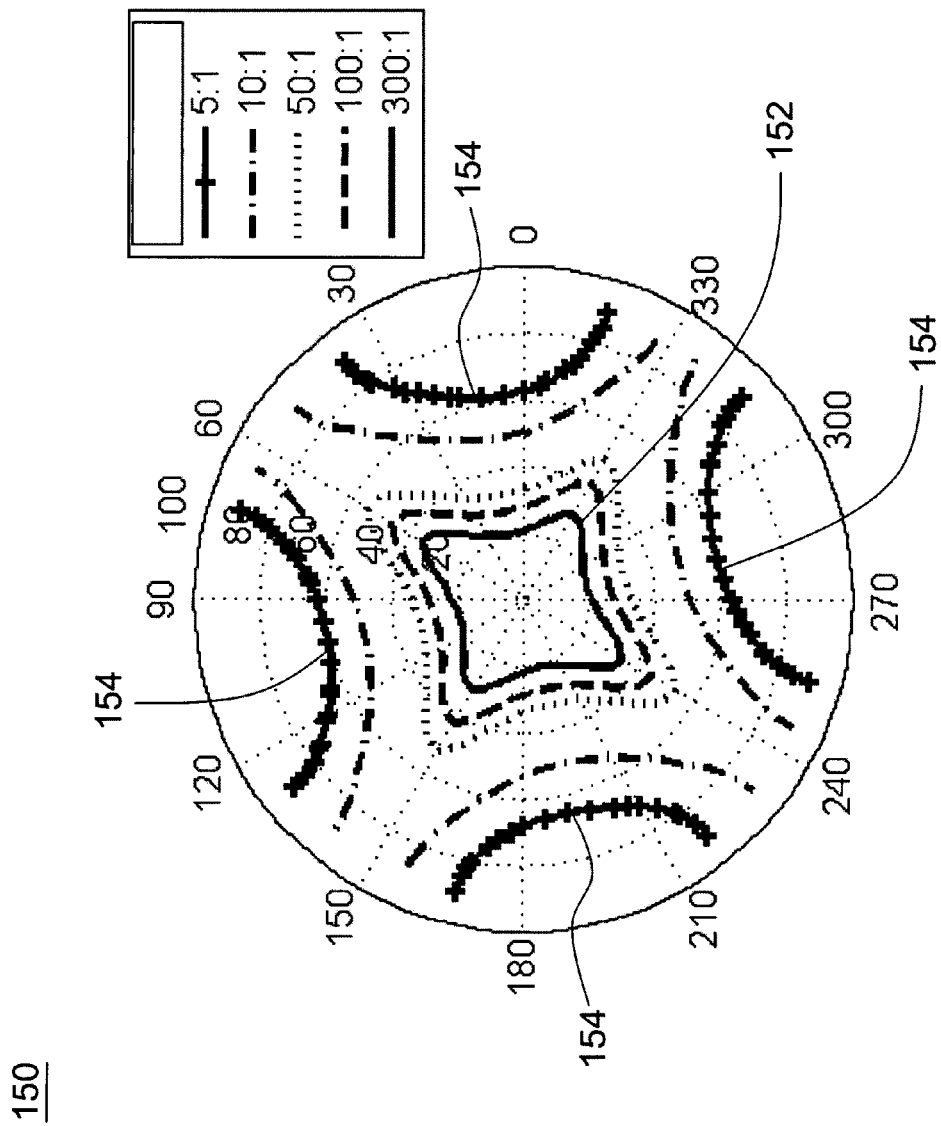
FIGS. 7, 12, 18, 24, 29, and 34 are simulated iso-contrast plots for T sub-pixels.

FIG. 7 is a simulated iso-contrast plot 150 for the T sub-pixel 116 when compensation films including the first positive a-plate 162, the negative c-plate 164, and the second positive a-plate 166 shown in FIG. 6 are used. The plot 150 includes iso-contrast lines on which the contrast ratio is constant. An iso-contrast line 152 shows that a contrast ratio of 300:1 can be achieved within a ±20° viewing cone. Iso-contrast lines 154 show that a contrast ratio of 5:1 can be achieved along the left-right and up-down directions within a ±60° viewing cone. This indicates that the T sub-pixel 116 has a view angle wider than 120° at 5:1 contrast ratio.

The contrast ratio values in FIG. 7 (as well as FIGS. 12, 18, 24, 29, and 34) are obtained by dividing the light transmittance at $V_{DATA}$=5 $V_{RMS}$ by the light leakage at $V_{DATA}$=0 $V_{RMS}$ for each respective viewing angle.

In the description below for the simulations of the iso-contrast plots for the T sub-pixel 116 of the pixel 180 of FIG. 9, pixel 230 of FIG. 14, pixel 280 of FIG. 20, pixel 330 of FIG. 26, and pixel 380 of FIG. 31, compensation films including the first positive a-plate 162, the negative c-plate 164, and the second positive a-plate 166 shown in FIG. 6 are used. The simulations do not take into account reflections at the surfaces of the polarizers, compensation films, and a substrates.

Figure 8:
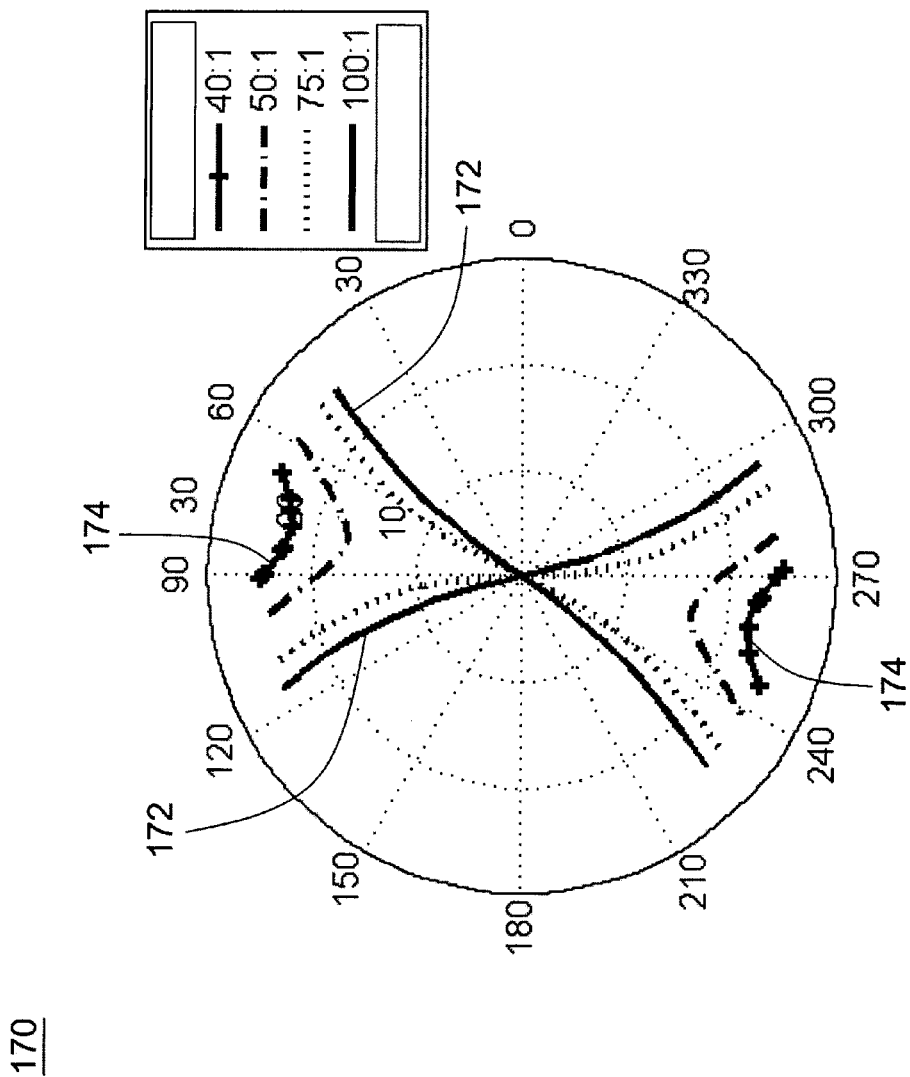
FIGS. 8, 13, 19, 25, 30, and 35 are simulated iso-contrast plots for R sub-pixels.

FIG. 8 is a simulated iso-contrast plot 170 for the R sub-pixel 116 when compensation films including the negative c-plate 164 and the second positive a-plate 166 shown in FIG. 6 are used. The ambient light 118 modulated by the R sub-pixel 116 is not affected by the first a-plate 162. The plot 170 includes iso-contrast lines that are determined by setting the ambient light to have a 30° incidence angle and reflectance angles within ±30°. The simulation does not take into account reflections at the surfaces of the polarizers, compensation films, and substrates. Iso-contrast lines 172 indicate that a high contrast ratio of 100:1 can be achieved in the left-right direction, and iso-contrast lines 174 indicate that a contrast ratio of 40:1 can be achieved within a ±25° viewing cone.

The contrast ratio values in FIG. 8 (as well as FIGS. 13, 19, 25, 30, and 35) are obtained by dividing the light reflectance at $V_{DATA}$=5 $V_{RMS}$ by the light leakage at $V_{DATA}$=0 $V_{RMS}$ for each respective viewing angle.

In the description below for the simulations of the iso-contrast plots for the R sub-pixel 114 of the pixel 180 of FIG. 9, pixel 230 of FIG. 14, pixel 280 of FIG. 20, pixel 330 of FIG. 26, and pixel 380 of FIG. 31, compensation films including the negative c-plate 164 and the second positive a-plate 166 are used. The simulations were performed by setting the ambient light to have a 30° incidence angle and reflectance angles within 30°. The simulation does not take into account reflections at the surfaces of the polarizers, compensation films, and substrates.

FIGS. 5, 7, and 8 show that a transflective display using the pixels 100 of FIG. 2 can have a high light efficiency, a high contrast ratio, and a wide viewing angle in both the transmissive and reflective modes. The pixel 100 does not show gray-scale inversion in either the R sub-pixel 114 or the T sub-pixel 116 for pixel voltages between 0 to 5 $V_{RMS}$. The pixel 100 has a single cell gap and is easy to manufacture. The pixel 100 can be driven by a single thin film transistor (TFT) due to the close matching of the V-T curve 142 and V-R curve 144. A transflective display having the pixels 100 is useful in, e.g., portable electronic devices.

Example 2 of a Transflective Pixel

Figure 9:
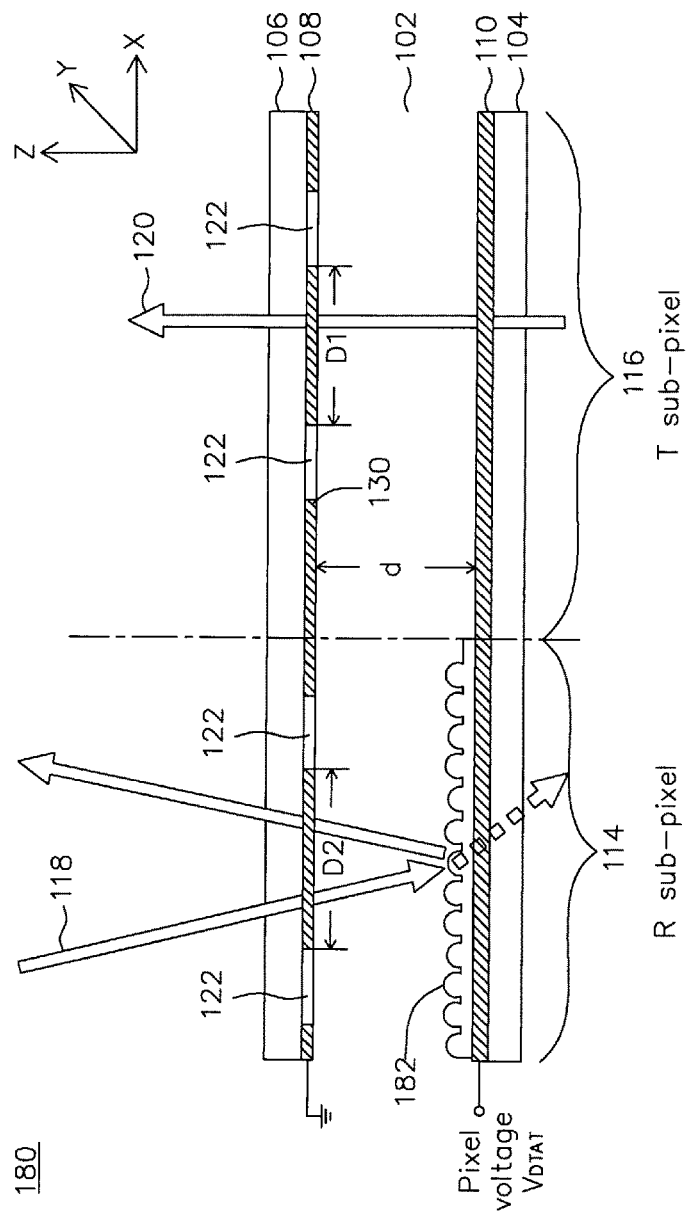

FIG. 9 is a cross sectional diagram of an example of a pixel 180 that is similar to the pixel 100 of FIG. 2, except that a transflective electrode 182 is used instead of the reflective electrode 112. The transflective electrode 182 allows a portion of the ambient light 118 to pass, and reflects a portion of the ambient light 118. The transflective electrode 182 can be, e.g., a polarization dependent reflector that transmits light having a first polarization and reflects light having a second polarization. The transflective electrode 182 can be, e.g., a grating-like metal structure having strips of parallel metal lines. The metal can be, e.g., aluminum. For example, the metal grating has a width of 1 μm, a pitch of 2 μm, and a thickness less than 100 nm. Because the transflective electrode 182 is thin, the liquid crystal layer 102 has substantially the same thickness in both the R sub-pixel 114 and the T-sub-pixel 116. The transflective electrode 182 is electrically connected to the pixel electrode, so a single TFT can be used to drive the electrodes 110 and 182.

Figure 10:
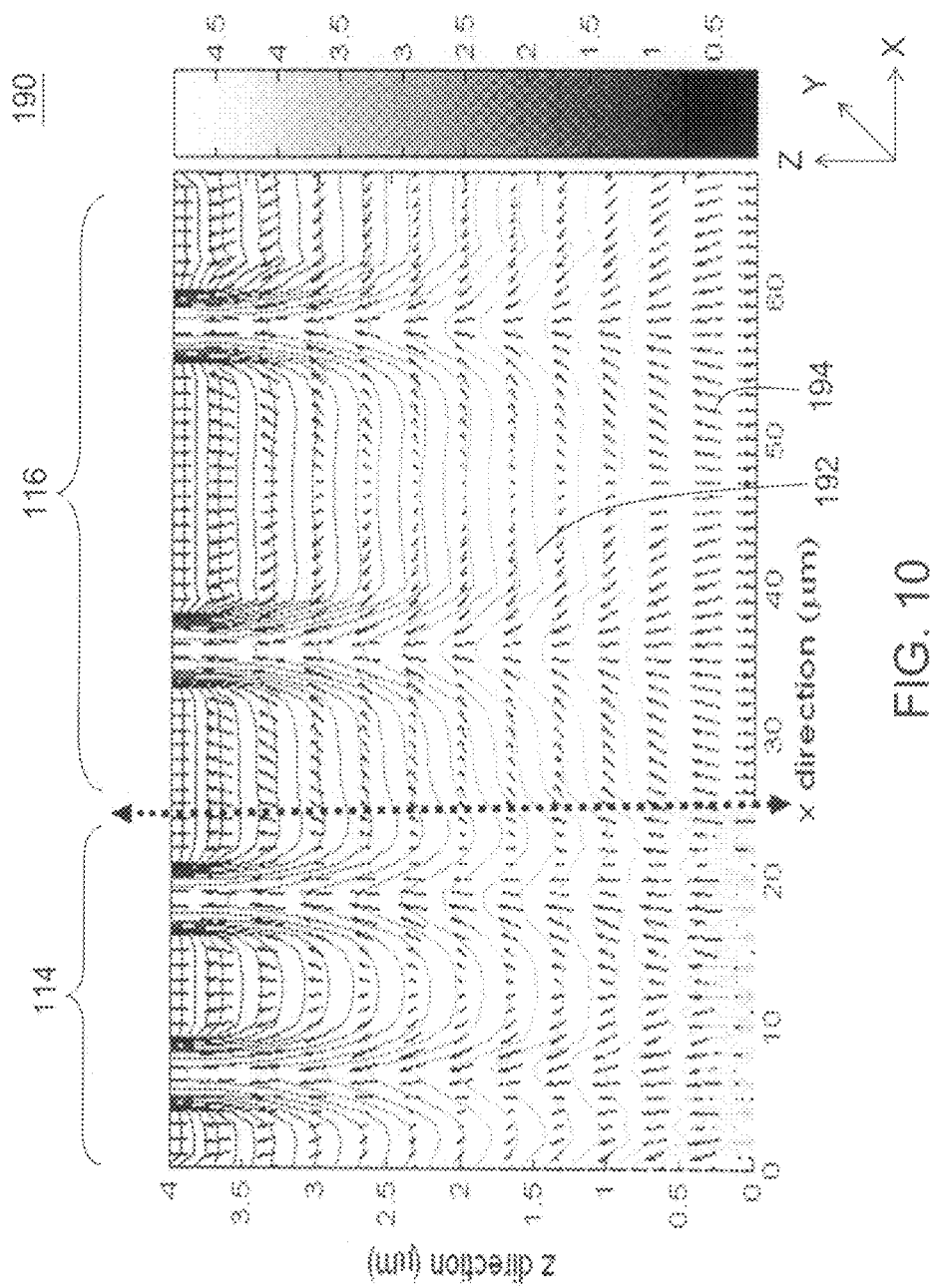

FIG. 10 is a graph 190 showing electric potential lines 192 in the liquid crystal layer 102 and a distribution of liquid crystal directors 194 on an X-Z plane along the center of the pixel 180 of FIG. 9. A pixel voltage $V_{DATA}=5\ V_{RMS}$, which corresponds to a bright state or white color, is applied to the pixel electrode 110 and the transflective electrode 182.

In the simulations for the pixel 180 of FIG. 9, the size of the pixel 180 is 68 μm×68 μm, the cell gap d is 4 μm, the slit width S1 is 4 μm, the slit gap D1 is 18 μm for the T sub-pixel 116, and the slit gap, D2 is 8 μm for the R sub-pixel 114. This results in a reflective opening ratio ORr that is equal to 32% and a transmissive opening ratio ORt that is equal to 18.6%.

The graph 190 shows that, due to the effects of longitudinal electric fields and fringe electric fields in the R sub-pixel 114 and T sub-pixel 116, multiple domains are formed in the liquid crystal layer 102 in both the R sub-pixel and T sub-pixel 116.

Figure 11:
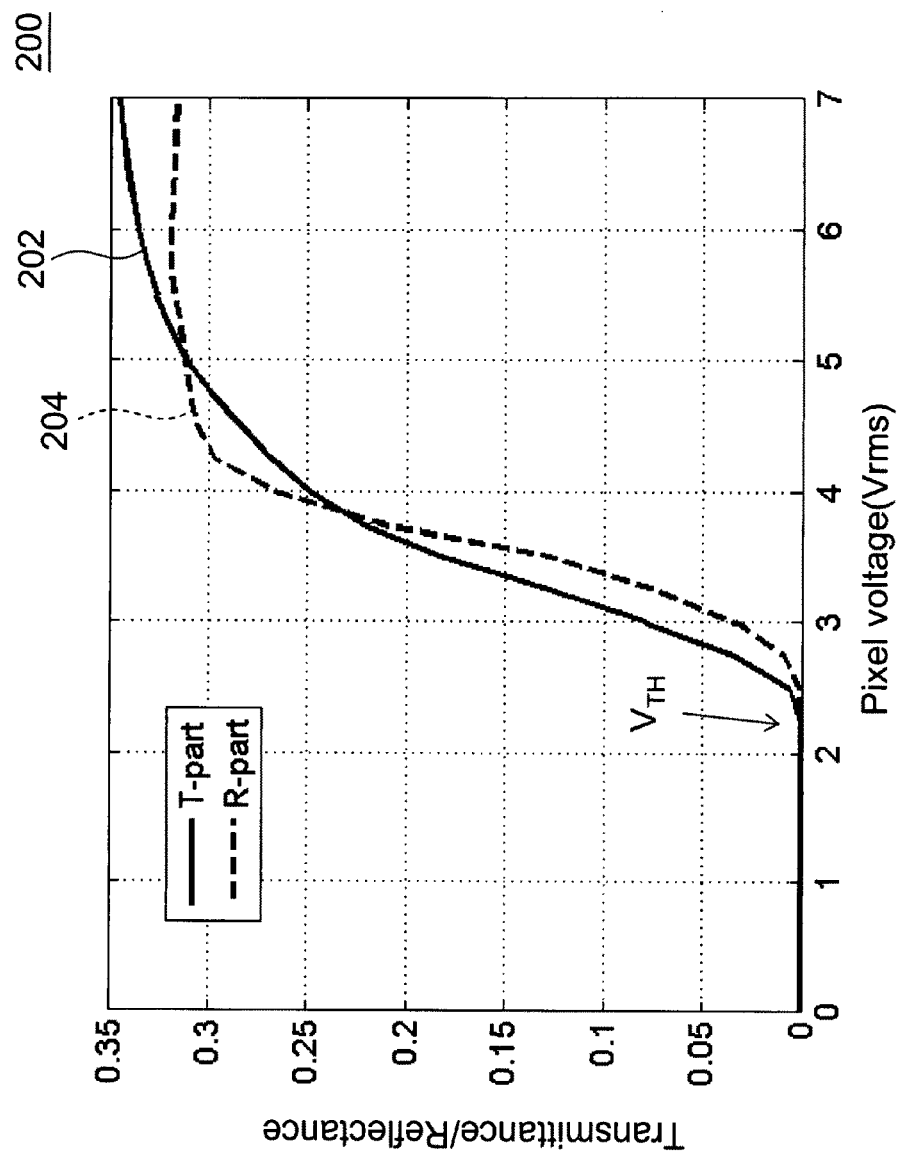

FIG. 11 is a graph 200 showing a voltage-dependent transmittance (V-T) curve 202 and a voltage-dependent reflectance (V-R) curve 204 of the pixel 180 of FIG. 9. The R sub-pixel 114 and the T sub-pixel 116 have almost the same threshold voltage $V_{TH}=2.25\ V_{RMS}$. When the pixel voltage $V_{DATA}$ is below 5 $V_{RMS}$, the V-T curve 202 and V-R curve 204 match more closely, as compared to a pixel having the reflective opening ratio equal to the transmissive opening ratio. Using Equ. 1 and assuming that pixel voltage V=2.25 $V_{RMS}$ corresponds to gray level 0 and V=5.0 $V_{RMS}$ corresponds to gray level 255, the RMS difference between the V-T curve 202 and the V-R curve 204 in FIG. 11 is about 3.9%. The matching between the V-T curve 202 and V-R curves 204 indicates that the R sub-pixel 114 and T sub-pixel 116 of the transflective pixel 180 can be driven by a single thin film transistor.

When the pixel voltage is 5 $V_{RMS}$, the transmittance is about 31.1%, and the reflectance is about 31.2%. The pair of broadband circular polarizers 91 and 95 has a maximum transmittance of 35%. Thus, the pixel 180 has a high optical efficiency of 89% for both transmissive and reflective modes at 5 $S_{VRM}$ when normalized to the transmittance of the circular polarizers 91 and 95.

Figure 12:
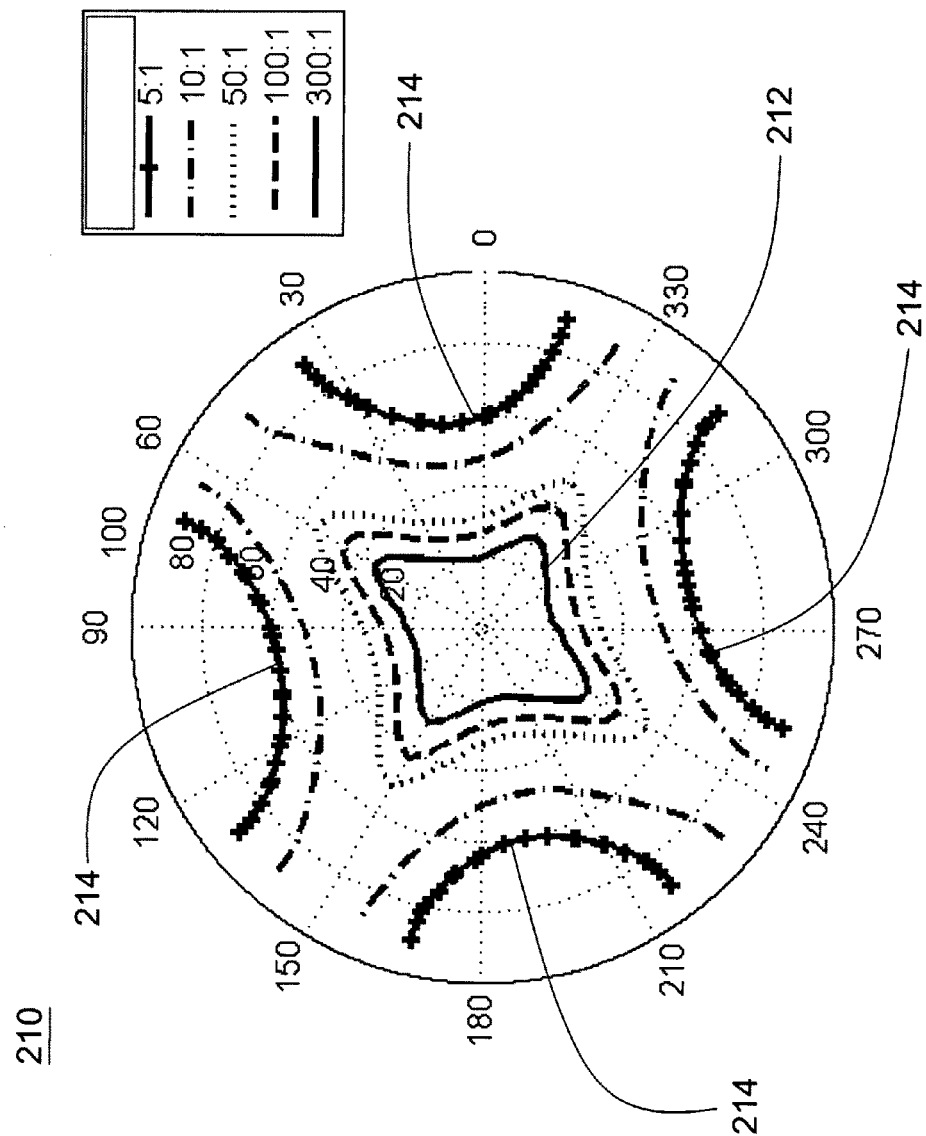

FIG. 12 is a simulated iso-contrast plot 210 for the T sub-pixel 116 of the pixel 180 of FIG. 9. An iso-contrast line 212 indicates that a contrast ratio of 300:1 can be achieved within a ±20° viewing cone. Iso-contrast lines 214 indicate that a contrast ratio of 5:1 can be achieved within a ±60° viewing cone. This indicates that the T sub-pixel 116 has a viewing angle wider than 120 at 5:1 contrast ratio. Compensation films including the a-plates 162 and 166, and the c-plate 164 (FIG. 6) are used in the simulation for the plot 210.

Figure 13:
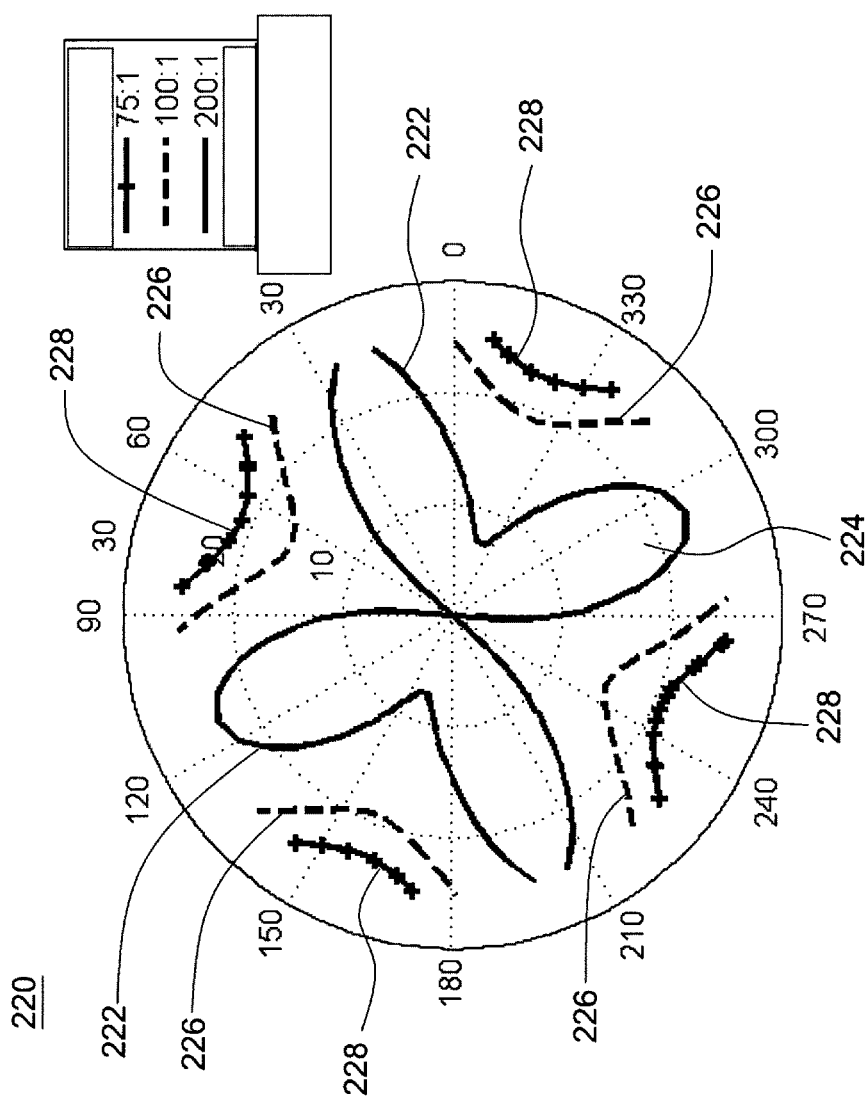

FIG. 13 is a simulated iso-contrast plot 220 for the R sub-pixel 114 of the pixel 180 of FIG. 9. Iso-contrast lines 222 indicate that a contrast ratio greater than 200:1 can be achieved for certain viewing directions 224. Iso-contrast lines 226 indicate that a contrast ratio of about 100:1 can be achieved within a ±15° viewing cone, and iso-contrast lines 228 indicate that a contrast ratio of about 75:1 can be achieved within a ±25° viewing cone. Compensation films including the c-plate 164 and the a-plate 166 (FIG. 6) are used in the simulation for the plot 220.

FIGS. 11 to 13 show that a transflective display using the pixels 180 of FIG. 9 can have a high light efficiency, a high contrast ratio, and a wide viewing angle in both transmissive, and reflective modes. There is no grayscale inversion in either the R-sub-pixel 114 or the T sub-pixel 116 for pixel voltages between 0 to 5 $V_{RMS}$. The pixel 180 has a single cell gap and is easy to manufacture. The pixel 180 can be driven by a single TFT due to the close matching of the V-T curve 202 and V-R curve 204. A transflective display having the pixels 180 is useful in, e.g., portable electronic devices.

Example 3 of a Transflective Pixel

Figure 14:
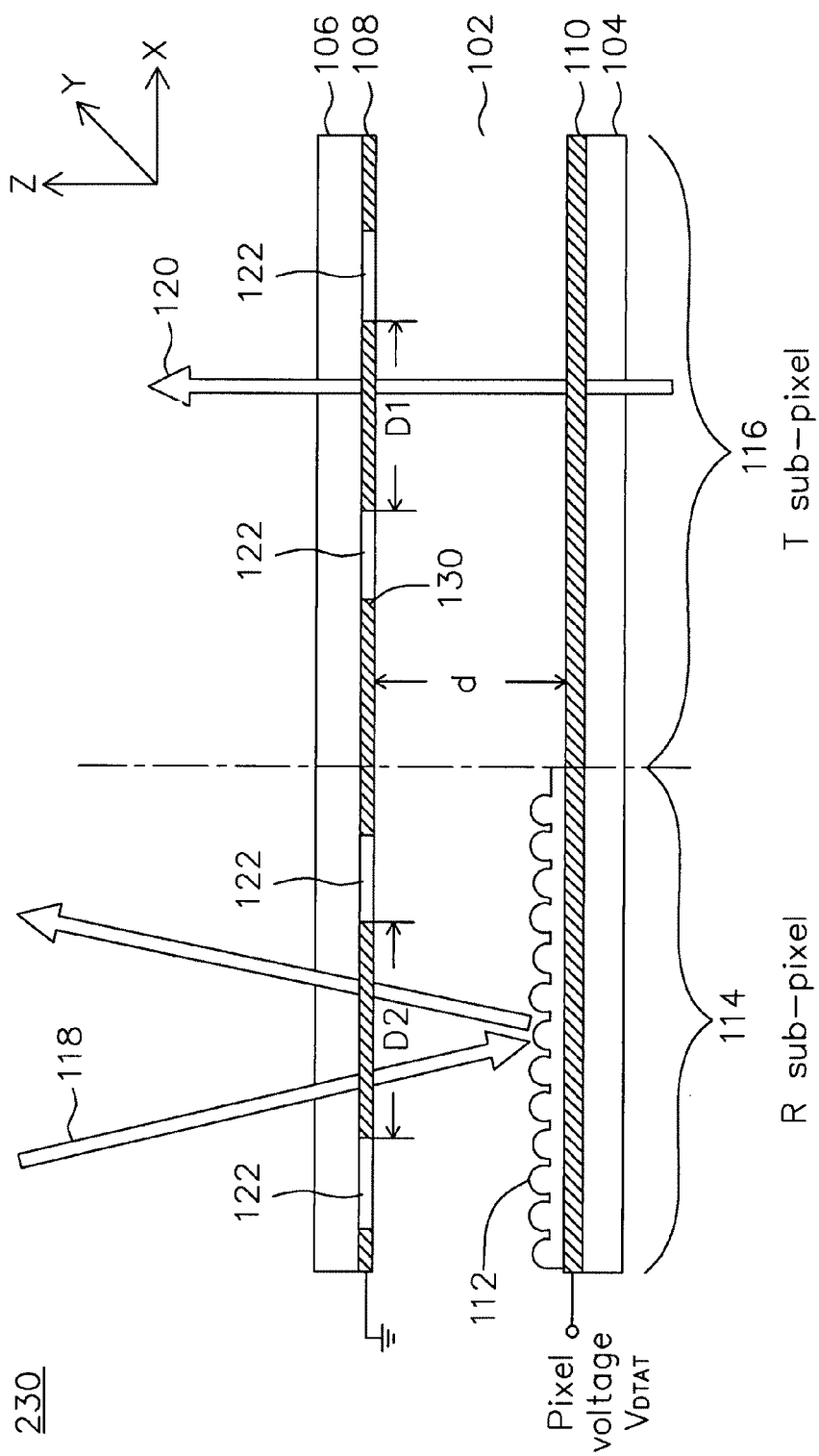

FIG. 14 is a cross-sectional diagram of an example of a pixel 230 that is similar to the pixel 100 of FIG. 2, except that the openings 122 have edges along several directions so that the electric field varies in both the x-direction and the y-direction. This causes liquid crystal molecules to tilt in directions that vary in both the x- and y-directions, increasing the viewing angle in a wide range of directions.

Figure 15:
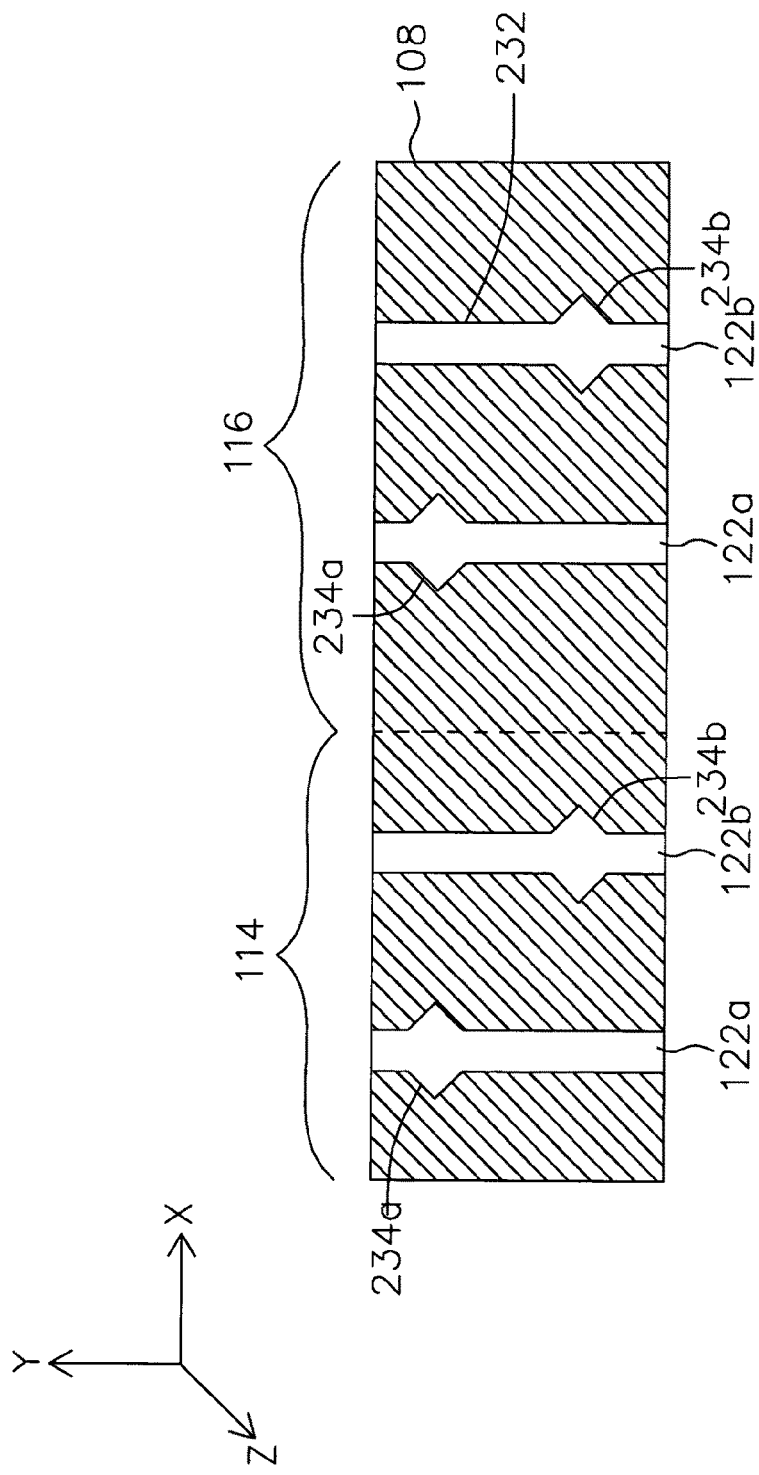
FIGS. 15 and 21 are diagrams of top views of common electrodes.

FIG. 15 is a diagram of a top view of an example of the common electrode 108 of the pixel 230 of FIG. 14. The common electrode 108 has openings, such as 122a and 122b, collectively referenced as 122. The openings 122 each has a generally rectangular shape (e.g., a slit) with side tips or protruded portions, such as 234a and 234b, collectively referenced as 234. The side tips 234 cause more domains to be formed than without the side tips 234. In some examples, the side tips 234 are formed on both sides of each opening 122 and arranged at alternate positions on neighboring openings. For example, the opening 122a has side tips 234a, and opening 122b has side tips 234b, and the side tips 234a are closer to the +y direction than the side tips 234b.

Figure 16:
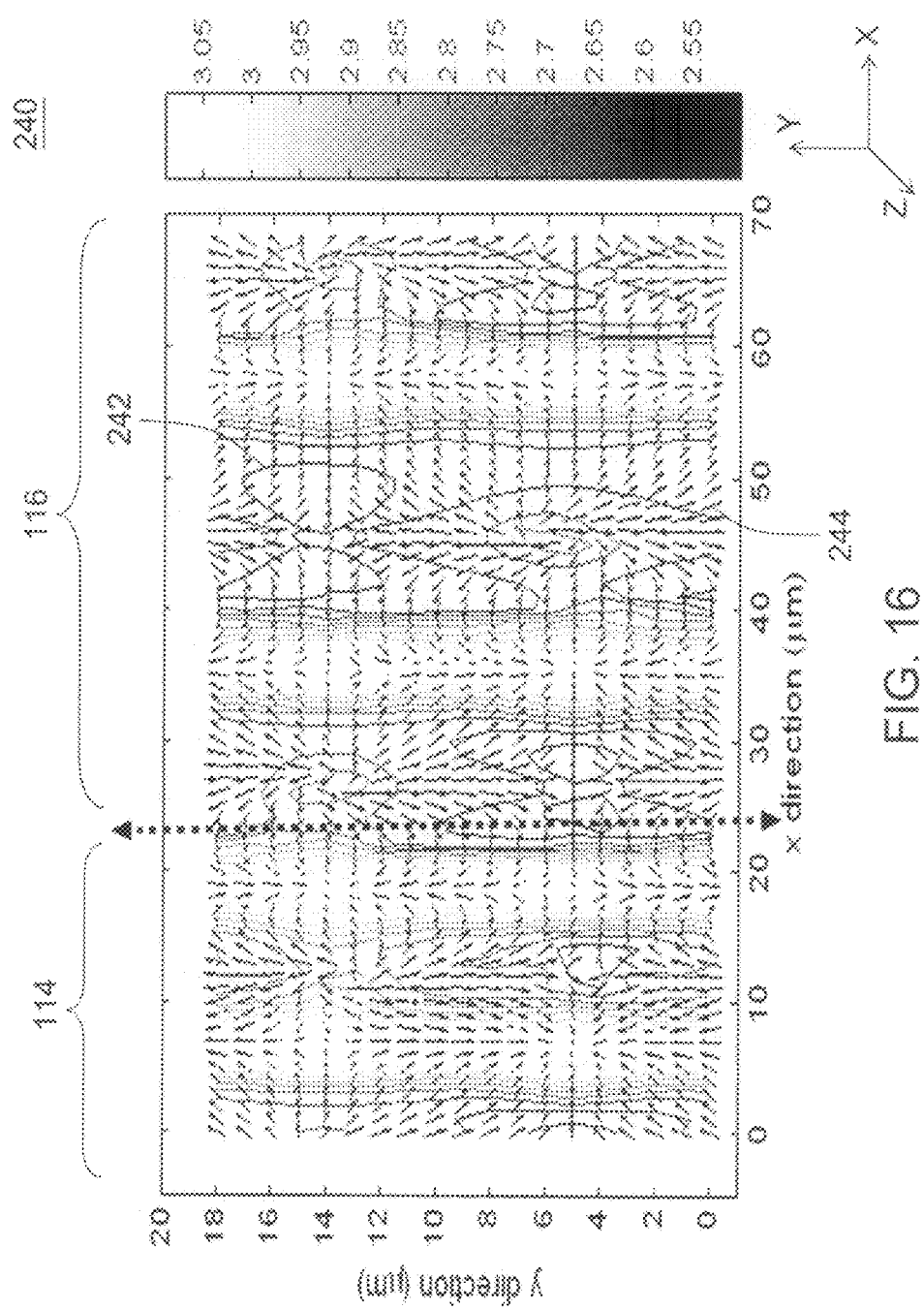

FIG. 16 is a graph 240 showing electric potential lines 242 in the liquid crystal layer 102 and a distribution of liquid crystal directors 244 on an X-Y plane along the center of the pixel 230 of FIG. 14. A pixel voltage $V_{DATA}=5\ V_{RMS}$ that corresponds to a bright state or white color is applied to the pixel electrode 110 and the reflective electrode 112 of the pixel 230. The graph 240 shows that the liquid crystal molecules 80 are reoriented in many directions forming multiple domains in the liquid crystal layer 102 in both the R sub-pixel 114 and T sub-pixel 116.

In the simulation for the graph 240, each of the side tips 234 is an equilateral right-angled triangle having a long side of 5 μm and a height of 3 μm. The size of the pixel 230 is 68 μm×18 μm. The openings 122 are all on the common electrode 108. For the rectangular-shape portions of the openings 122, the slit width S1 is 4 μm, the slit gap D1 is 18 μm for the T sub-pixel 116, aid the slit gap D2 is 8 μm for the R sub-pixel 114. The cell gap d is 4 μm. The reflective opening ratio ORr is about 39%, and the transmissive opening ratio ORt is about 22.5%.

Figure 17:
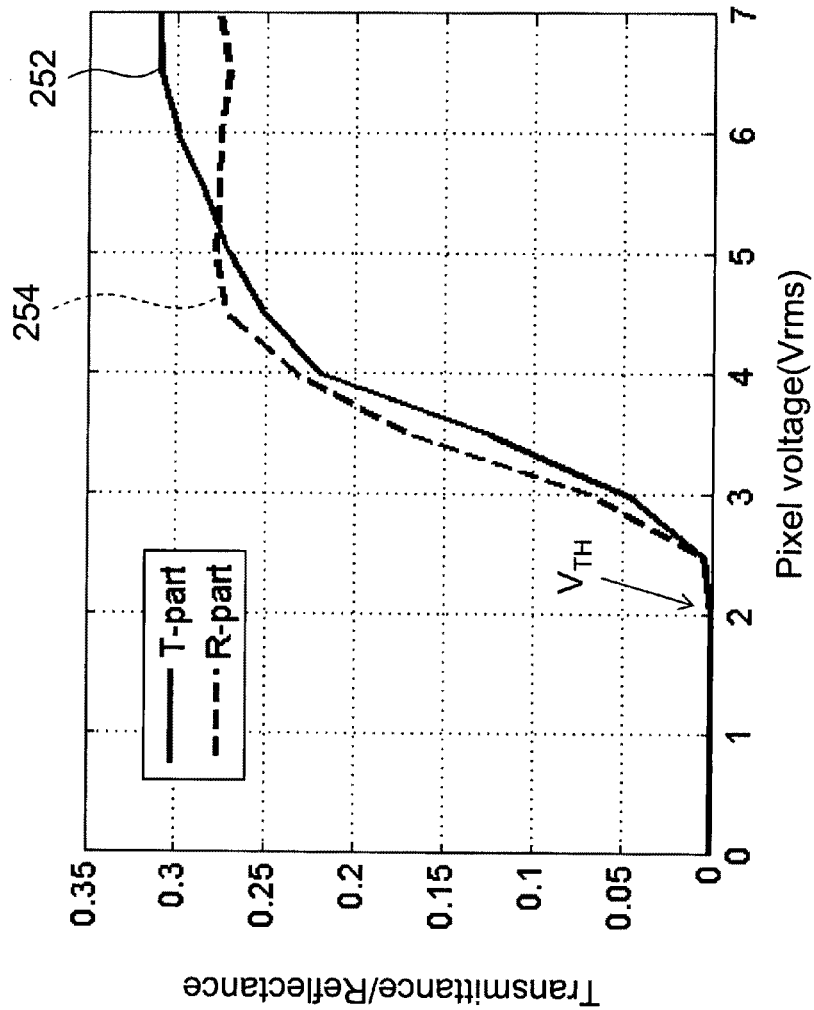

FIG. 17 is a graph 250 showing simulated data for a voltage-dependent transmittance (V-T) curve 252 and a voltage-dependent reflectance (V-R) curve 254 of the pixel 230 of FIG. 14. The R sub-pixel 114 and the T sub-pixel 116 have substantially the same threshold voltage $V_{TH}=2\ V_{RMS}$. When the pixel voltage $V_{DATA}$ is below 5.5 $V_{RMS}$, the V-T curve 252 and V-R curve 254 match more closely than a pixel having equal reflective and transmissive opening ratios. Using Equ. 1 and assuming that pixel voltage V=2 $V_{RMS}$ corresponds to gray level 0 and V=–5.5 $V_{RMS}$ corresponds to gray level 255, the RMS difference between the V-T curve 252 and the V-R curve 254 in FIG. 17 is about 2.4%. The matching between the V-T curve 252 and V-R curve 254 indicates that the transflective pixel 230 can be driven by a single thin film transistor while having a matched gamma curve between the R sub-pixel 114 and T sub-pixel 116.

When the pixel voltage is 5 $V_{RMS}$, the transmittance is about 27.1%, and the reflectance is about 28.0%. The air of broadband circular polarizers 91, 95 has a maximum transmittance of 35%. Thus, the pixel 230 has a high optical efficiency of 77.4% and 80.0% for the transmissive and reflective modes, respectively, at 5 $V_{RMS}$ when normalized to the transmittance of the circular polarizers.

Figure 18:
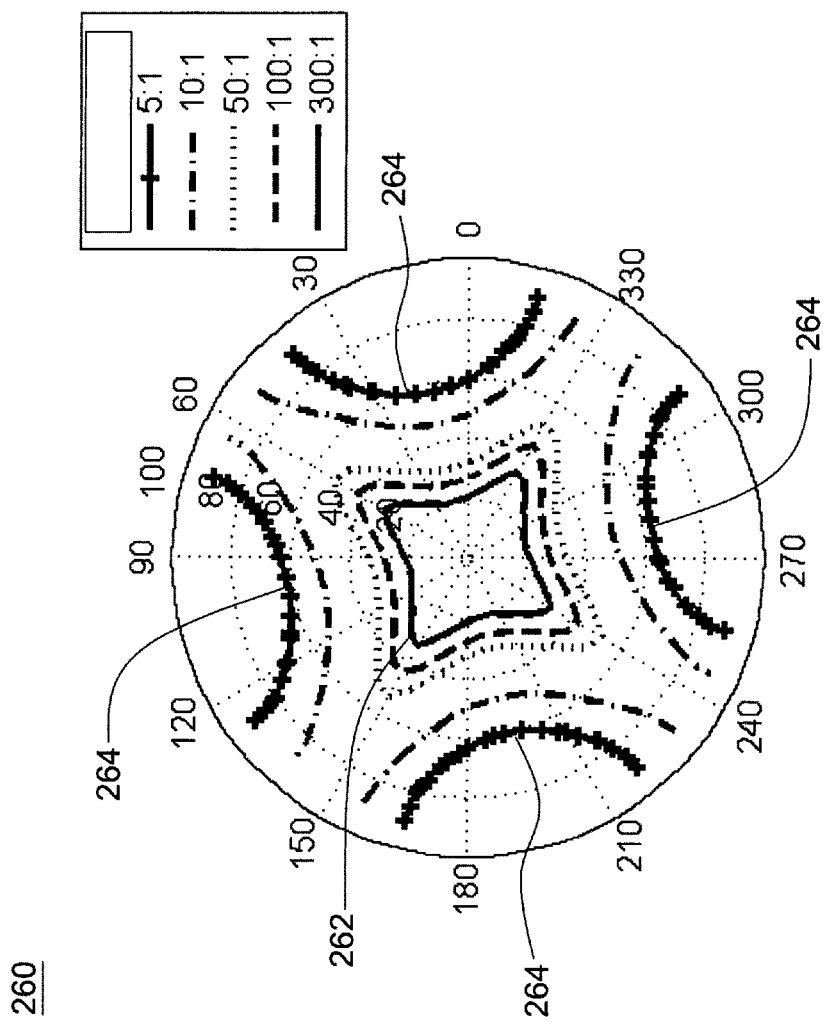

FIG. 18 is a simulated iso-contrast plot 260 for the T sub-pixel 116 of the pixel 230 of FIG. 14. An iso-contrast line 262 indicates that, for the T sub-pixel 116, a contrast ratio of 300:1 can be achieved within a ±20° viewing cone. Iso-contrast lines 264 indicate that a contrast ratio of 5:1 can be achieved within a ±60° viewing cone. A display having the pixels 230 has a wide view angle of about 120° with a contrast ratio of 5:1 in the transmissive mode. Compensation films including the a-plates 162 and 166, and the c-plate 164 (FIG. 6) are used in the simulation for the plot 260.

Figure 19:
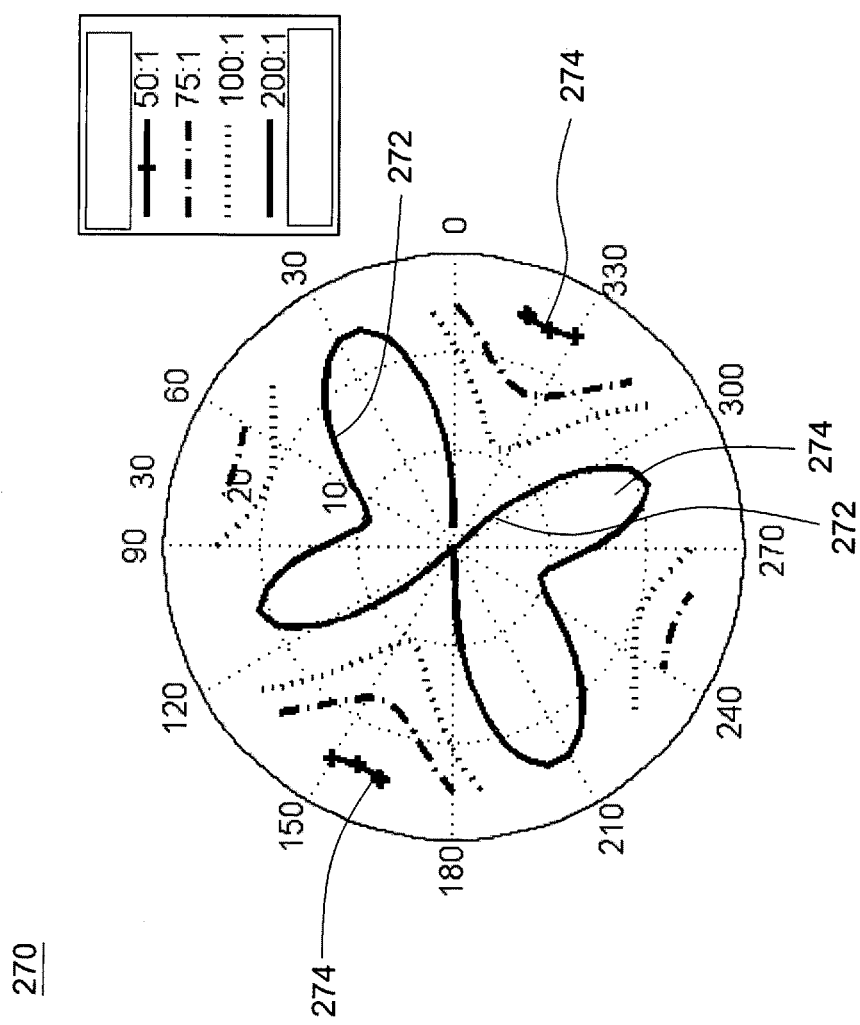

FIG. 19 is a simulated iso-contrast plot 270 for the R sub-pixel 114 of the pixel 230 of FIG. 14. Iso-contrast lines 272 indicate that a contrast ratio greater than 200:1 can be achieved for certain viewing directions. Iso-contrast lines 274 indicate that a contrast ratio of 50:1 can be achieved within a ±25° viewing cone. Compensation films including the c-plate 164 and the a-plate 166 (FIG. 6) are used in the simulation for the plot 270.

FIGS. 17 to 19 show that a transflective display having the pixels 230 (FIG. 14) can have a high light efficiency, a high contrast ratio, and a wide viewing angle in both transmissive and reflective modes. The pixel 230 does not show grayscale inversion in either the R sub-pixel 114 or the T sub-pixel 116 for pixel voltages between 0 to 5 $V_{RMS}$. The pixel 230 has a single cell gap and is easy to manufacture. The pixel 230 can be driven by a single TFT due to the close matching of the V-T curve 252 and V-R curve 254. A transflective display having the pixels 230 is useful in, e.g., portable electronic devices.

Example 4 of a Transflective Pixel

Figure 20:
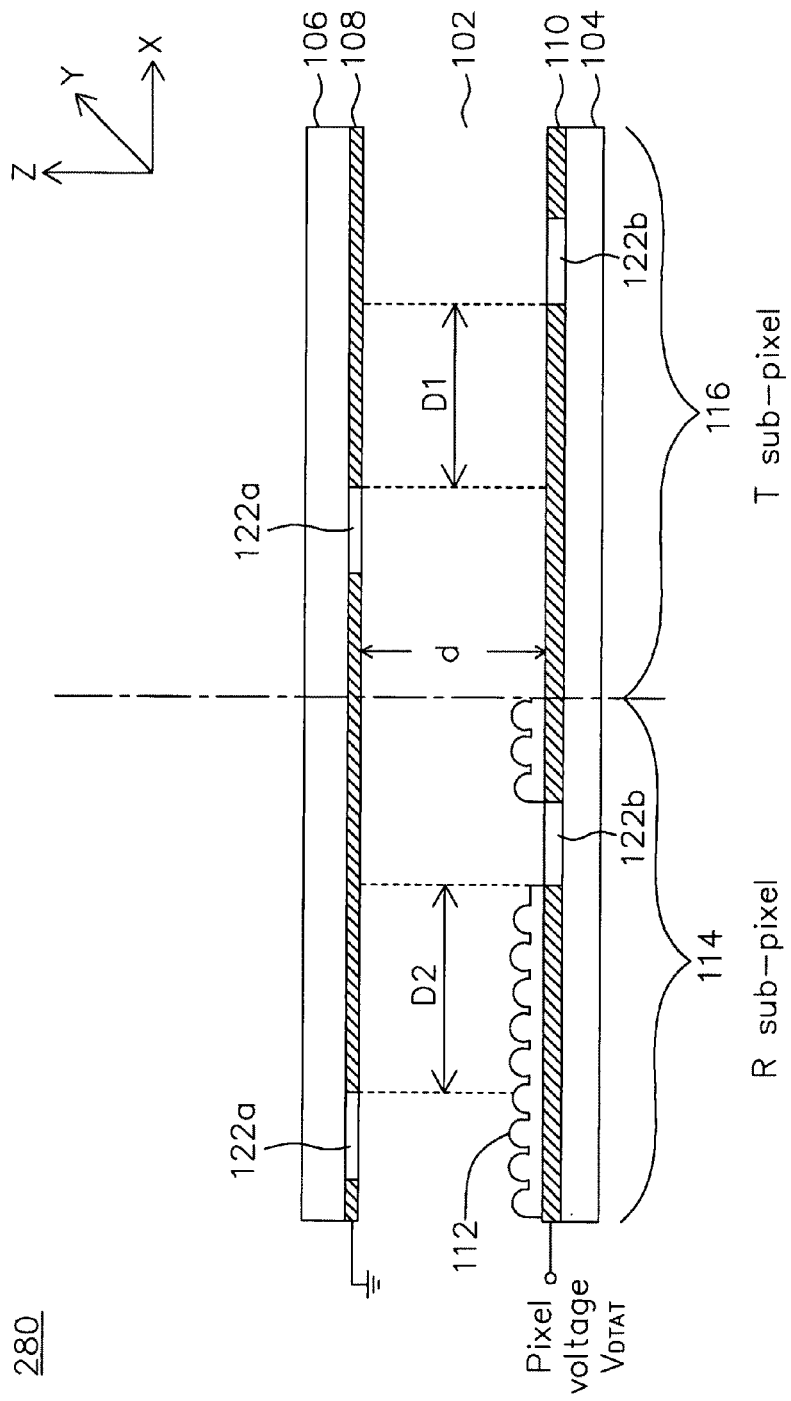

FIG. 20 is a cross-sectional diagram of an example of a pixel 280 that is similar to the pixel 230 of FIG. 14, except that some of the openings (e.g., 122a) are located at the common electrode 108 and some of the openings (e.g., 122b) are located at the pixel electrode 110 and the reflective electrode 112.

Figure 21:
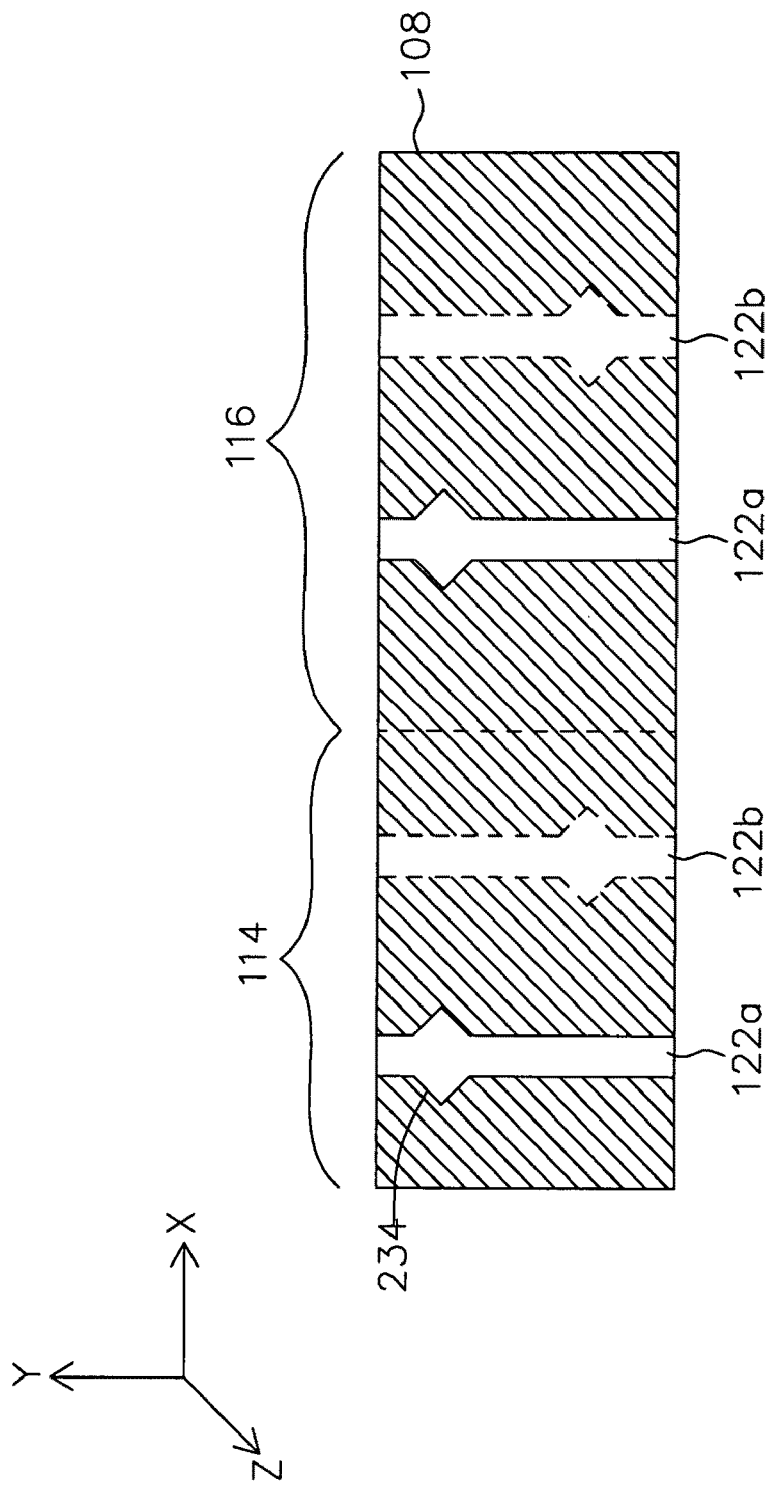

FIG. 21 is a diagram of a top view of an example of the common electrode 108 of the pixel 280 (FIG. 20). Pashed lines show the (hypothetically) projected positions of the openings 122b relative to the openings 122a. The shapes and dimensions of the openings 122a and 122b in the pixel 280 are similar to those of the pixel 230 (FIG. 14).

Figure 22:
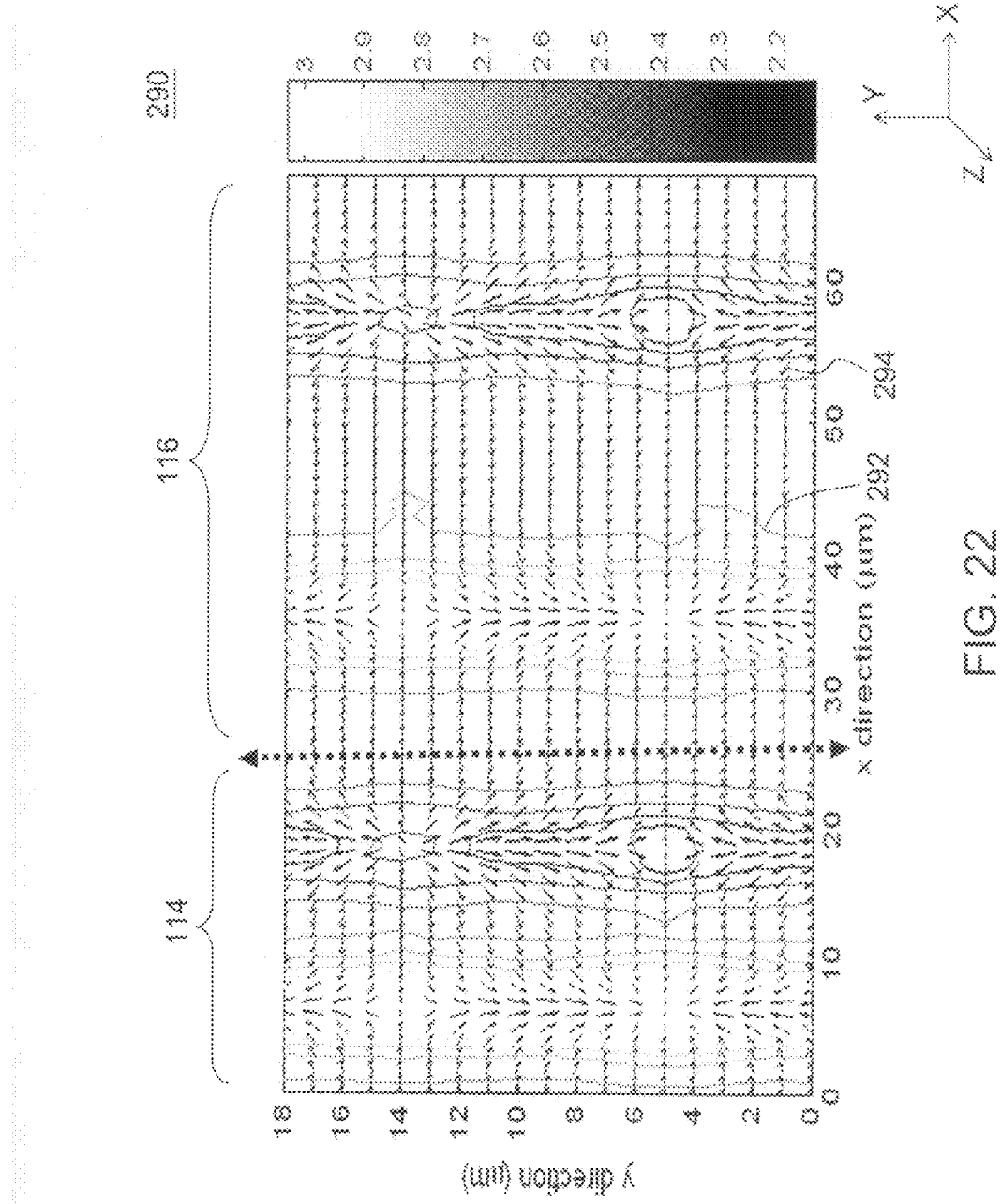

FIG. 22 is a graph 290 showing electric potential lines 292 in the liquid crystal layer 102 and a distribution of liquid crystal directors 294 on an X-Y plane along the center of the pixel 280 of FIG. 20. A pixel voltage $V_{DATA}=5\ V_{RMS}$ that corresponds to a bright state or white color is applied to the pixel electrode 110 and the reflective electrode 112 of the pixel 280. The graph 290 shows that the liquid crystal molecules 80 are reoriented in many directions, forming multiple domains in the liquid crystal layer 102 in both the R sub-pixel 114 and T sub-pixel 116.

In the simulation for the graph 290, each of the side tips 234 is an equilateral right-angled triangle having a long side of 5 μm and a height of 3 μm. The size of the pixel 230 is 68 μm×18 μm. The openings 122a are on the common electrode 108, and the openings 122b are on the pixel electrode 110 and the reflective electrode 112. For the T sub-pixel 116, the rectangular-shape portion of the openings 122 has a slit width S1=3 μm and a slit gap D1=18 μm. For the R sub-pixel 114, the rectangular-shape portion of the openings 122 has a slit width S2=4 μm and a slit gap D2=8 μm. The cell gap d is 4 μm. The reflective opening ratio ORr is about 39%, and the transmissive opening ratio ORt is about 17.8%.

Figure 23:
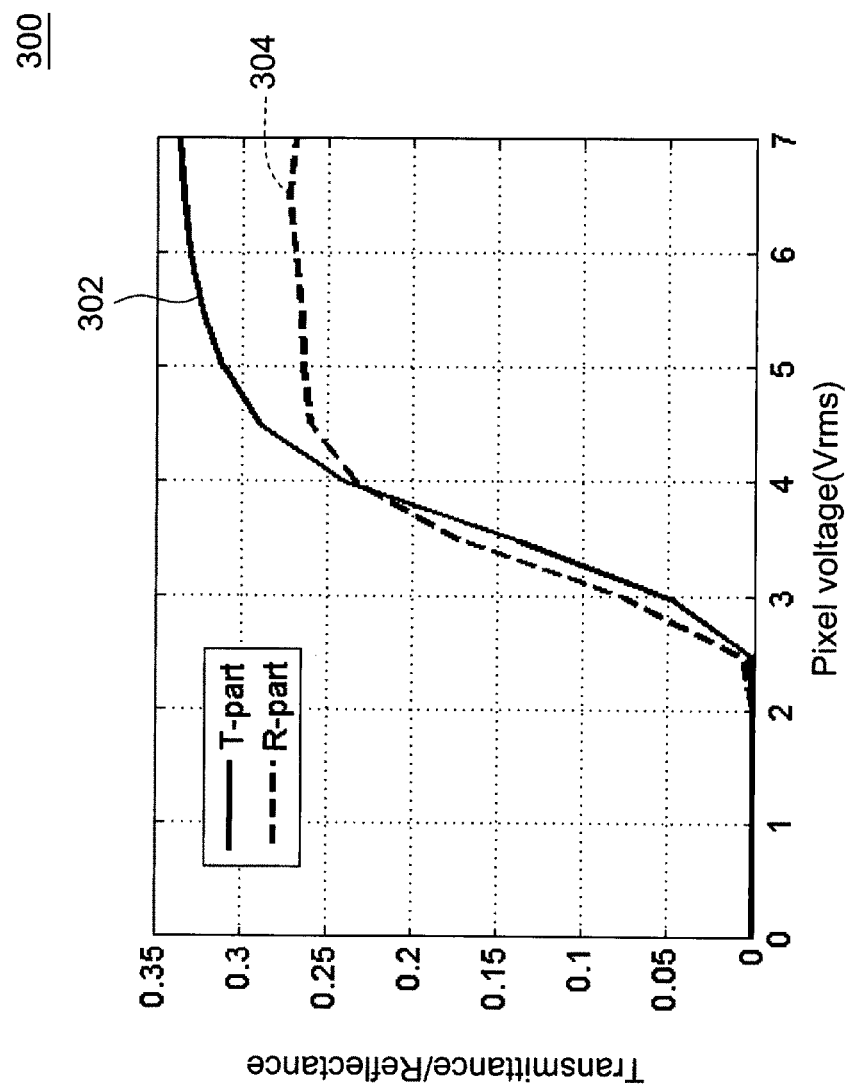

FIG. 23 is a graph 300 showing simulated data for a voltage-dependent transmittance (V-T) curve 302 and a voltage-dependent reflectance (V-R) curve 304 of the pixel 280 of FIG. 20. The R sub-pixel 114 and the T sub-pixel 116 have substantially the same threshold voltage $V_{TH}=2\ V_{RMS}$. When the pixel voltage $V_{DATA}$ is below 4.5 $V_{RMS}$, the V-T curve 302 and V-R curve 304 match more closely than a pixel having equal reflective and transmissive opening ratios. Using Equ. 1 and assuming that pixel voltage V=2 $V_{RMS}$ corresponds to gray level 0 and V=4.5 $V_{RMS}$ corresponds to gray level 255, the RMS difference between the V-T curve 302 and the V-R curve 304 is about 2.7%. The matching between the V-T curve 302 and V-R curve 304 indicates that the transflective pixel 280 can be driven by a single thin film transistor while having a matched gamma curve between the R sub-pixel 114 and T sub-pixel 116.

When the pixel voltage is 5 $V_{RMS}$, the transmittance is about 31.0%, and the reflectance is about 26.4%. The pair of broadband circular polarizers 91 and 95 has a maximum transmittance of 35%. Thus, the pixel 280 has a high optical efficiency of 88.6% and 75.4% for the transmissive and reflective modes, respectively, at 5 $V_{RMS}$ when normalized to the transmittance of, the circular, polarizers.

Figure 24:
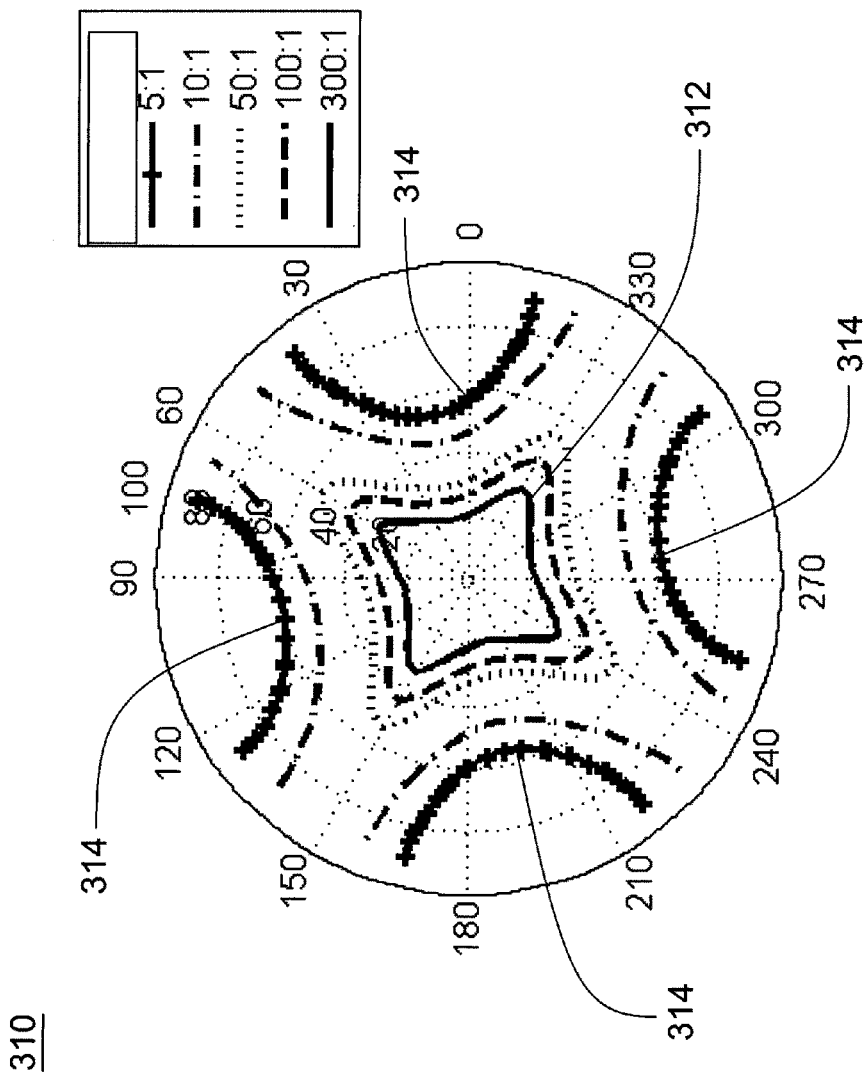

FIG. 24 is a simulated iso-contrast plot 310 for the T sub-pixel 116 of the pixel 280 of FIG. 20. An iso-contrast line 312 indicates that, for the T sub-pixel 116, a contrast ratio of 300:1 can be achieved within a ±20° viewing cone. Iso-contrast lines 314 indicate that a contrast ratio of 5:1 can be achieved within a ±60° viewing cone for most viewing directions. This indicates that a display using the pixels 280 has a wide viewing angle of about 120° with a contrast ratio of 5:1 when operating in the transmissive mode. Compensation films including the c-plate 164 and the a-plate 166 (FIG. 6) were used in the simulation for the plot 310.

Figure 25:
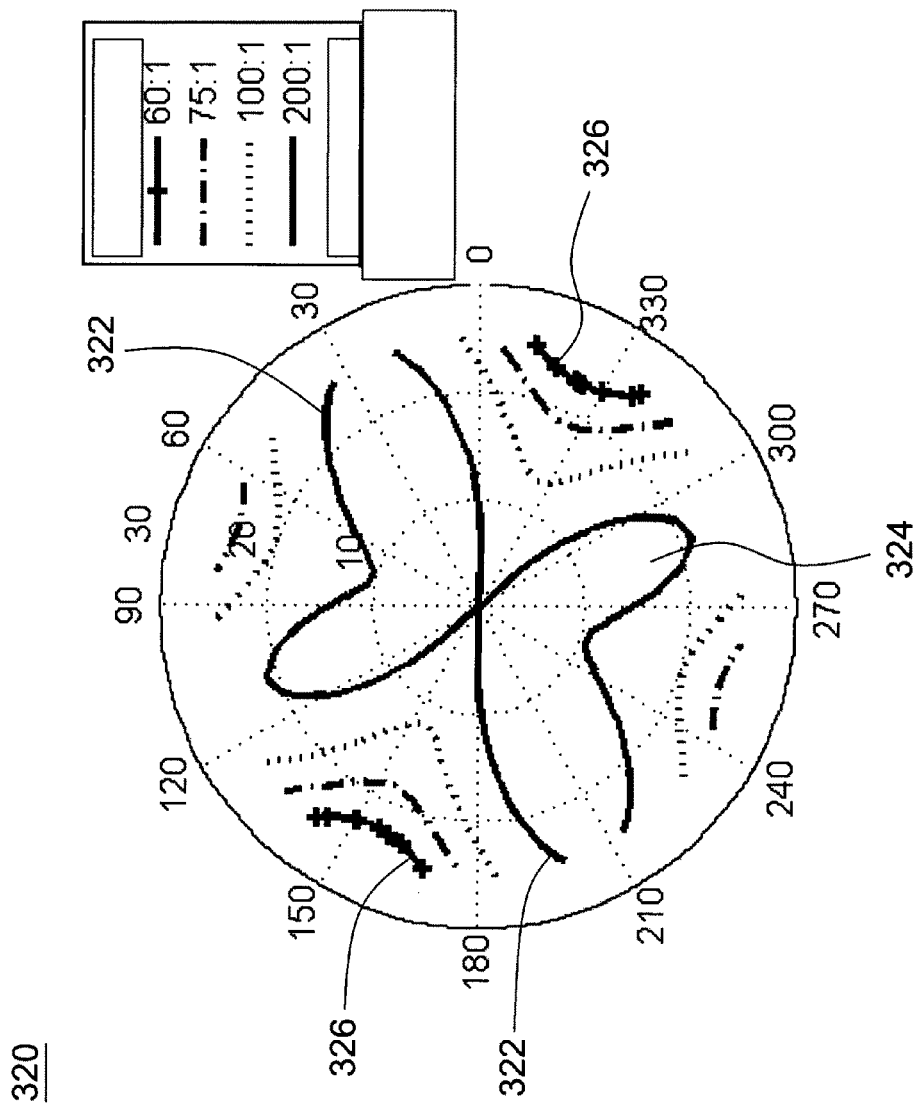

FIG. 25 is a simulated iso-contrast plot 320 for the R sub-pixel 114 of the pixel 280 of FIG. 20. Iso-contrast lines 322 indicate that a contrast ratio greater than 200:1 can be achieved for certain viewing directions 324. Iso-contrast lines 326 indicate that a contrast ratio of 60:1 can be achieved within a ±30° viewing cone for most directions. Compensation films including the c-plate 164 and the a-plate 166 (FIG. 6) were used in the simulation for the plot 320.

FIGS. 23 to 25 show that a transflective display using the pixels 280 of FIG. 20 can have a high light efficiency, a high contrast ratio, and a wide viewing angle in both transmissive and reflective modes. The pixel 280 does not show grayscale inversion in either the R sub-pixel 114 or the T sub-pixel 116 for pixel voltages between 0 to 5 $V_{RMS}$. The pixel 280 has a single cell gap and is easy to manufacture. The pixel 280 can be driven by a single TFT due to the close matching of the V-T curve 302 and V-R curve 304. A transflective display having the pixels 280 is useful in, e.g., portable electronic devices.

Example 5 of a Transflective Pixel

Figure 26:
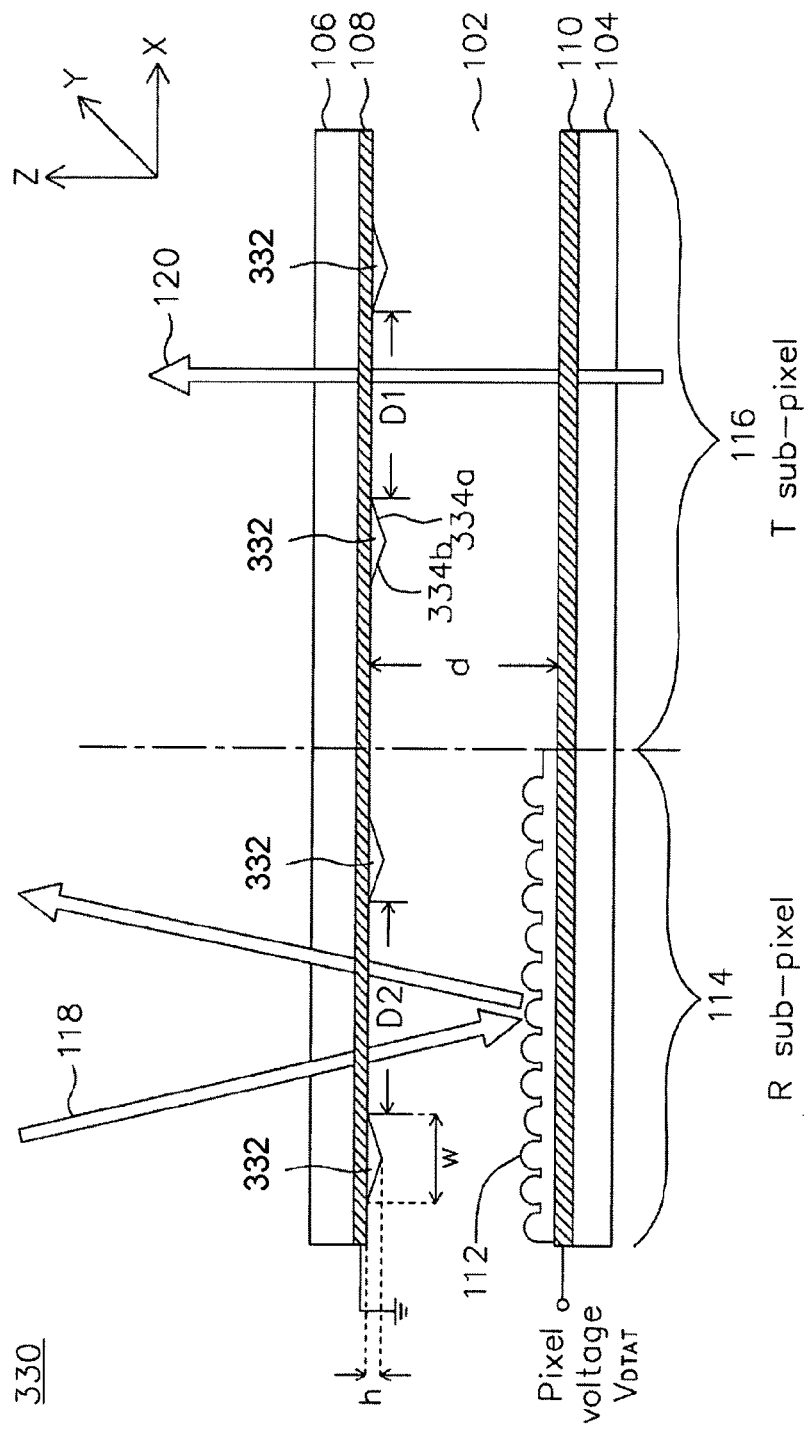

FIG. 26 is a cross-sectional diagram of an example of a pixel 330 that uses protrusions 332 on a continuous common electrode 108 to cause multiple domains to be formed in a liquid crystal layer 102. The pixel 330 has a pixel electrode 110 and a reflective electrode 112 similar to those of the pixel 100 in FIG. 2. The protrusions 332, when projected on an X-Y plane, has a rectangular shape. The protrusions 332 extend into the liquid crystal layer 102 and have sloped surfaces 334a and 334b that cause the formation of fringe electric fields in the layer 102.

The protrusions 332 can be formed by depositing and etching silicon oxides ($SiO_2$) or silicon nitrides ($SiN_x$) during a thin film transistor (TFT) fabrication process. The protrusions 332 each has a cross section along the X-Z plane having the shape of an equilateral triangle having a bottom side length w=5 μm and a height h=1.2 μm.

In the description below, FIGS. 27 to 30 show simulated data for the pixel 330 of FIG. 26. In the simulations, the size of the pixel 330 projected on the X-Y plane is 80 μm×80 μm. The protrusions 332 are all on the common electrode 108. In the T sub-pixel 116, there is a gap D1=20 μm between the protrusions 332. In the R sub-pixel 114, there is a gap D2=10 μm between the protrusions 332. The cell gap d is 4 μm. The reflective protrusion ratio ORr is about 33.3%, and the transmissive protrusion ratio ORt is about 20%.

The reflective and transmissive protrusion ratios are calculated in a manner similar to the reflective and transmissive opening ratios described above. The reflective protrusion ratio is defined as an effective protrusion projection area of the R sub-pixel 114 divided by the area of the R sub-pixel 114. The effective protrusion projection area takes into account the base areas of the protrusions in both the common electrode 108 and the reflective electrode 112 within the R sub-pixel 114. The transmissive protrusion ratio is defined as the effective protrusion projection area of the T sub-pixel 116 divided by the area of the T sub-pixel 116. Here, the effective protrusion projection area takes into account the base areas of the protrusions in both the common electrode 108 and the pixel electrode 110 within the T sub-pixel 114.

Figure 27:
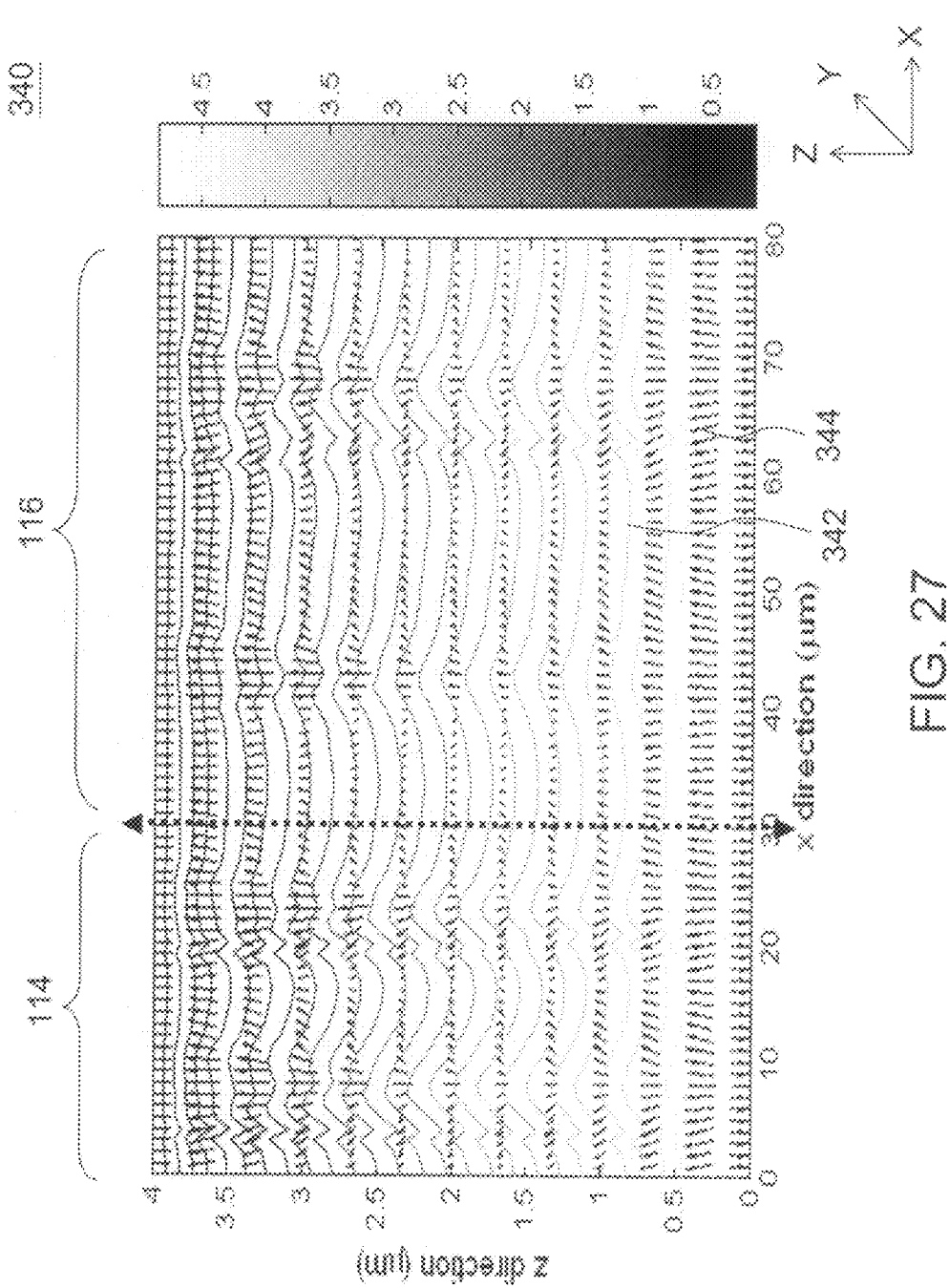

FIG. 27 is a graph 340 showing simulated data for electric potential lines 342 in the liquid crystal layer 102 and a distribution of liquid crystal directors 344 on an X-Y plane along the center of the pixel 330 of FIG. 26. A pixel voltage $V_{DATA}$=5 $V_{RMS}$ that corresponds to a bright state or white color was applied to the pixel electrode 110 and the reflective electrode 112 of the pixel 330. The graph 340 shows that the liquid crystal molecules are reoriented in many directions, forming multiple domains in the liquid crystal layer 102 in both the R sub-pixel 114 and T sub-pixel 116.

Figure 28:
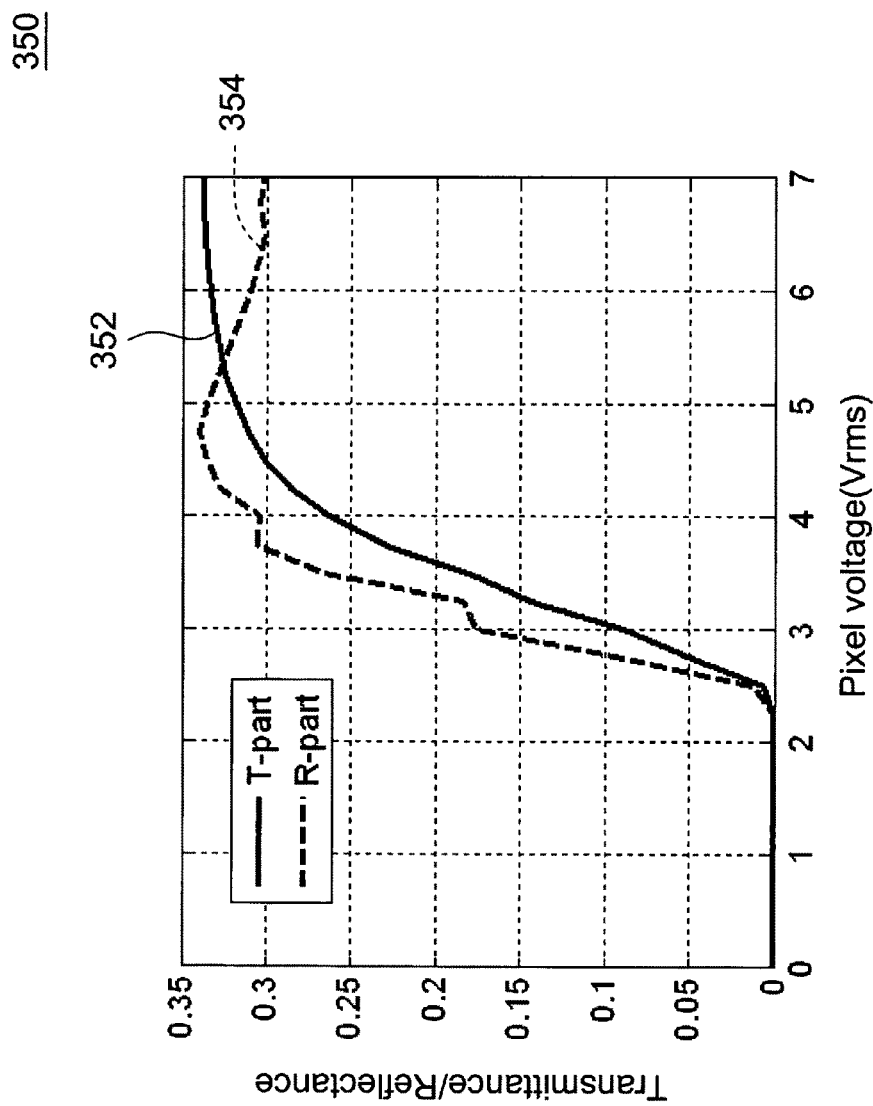

FIG. 28 is a graph 350 showing a voltage-dependent transmittance (V-T) curve 352 and a voltage-dependent reflectance (V-R) curve 354 of the pixel 330 of FIG. 26. The R sub-pixel 114 and the T sub-pixel 116 have substantially the same threshold voltage $V_{TH}$=2.25 $V_{RMS}$. When the pixel voltage $V_{DATA}$ is below 5 $V_{RMS}$, the V-T curve 352 and V-R curve 354 match more closely than a pixel having equal reflective and transmissive opening ratios. Using Equ. 1 and assuming that pixel voltage V=2.25 $V_{RMS}$ corresponds to gray level 0 and V=5.0 $V_{RMS}$ corresponds to gray level 255 the RMS difference between the V-T curve 352 and the V-R curve 354 in FIG. 28 is about 6.0%. The matching between the V-T curve 352 and V-R curve 354 indicates that the transflective pixel 330 can be driven by a single thin film transistor while having a matched gamma curve between the R sub-pixel 114 and T sub-pixel 116.

When the pixel voltage is 5. $V_{RMS}$, the transmittance is about 31.8%, and the reflectance is about 33.5%. The pair of broadband circular polarizers 91, 95 has a maximum transmittance of 35%. Thus, the pixel 280 has a high optical efficiency of 91.1% and 95.7% for the transmissive and reflective modes, respectively, at 5 $V_{RMS}$ when normalized, to the transmittance of the circular polarizers.

Figure 29:
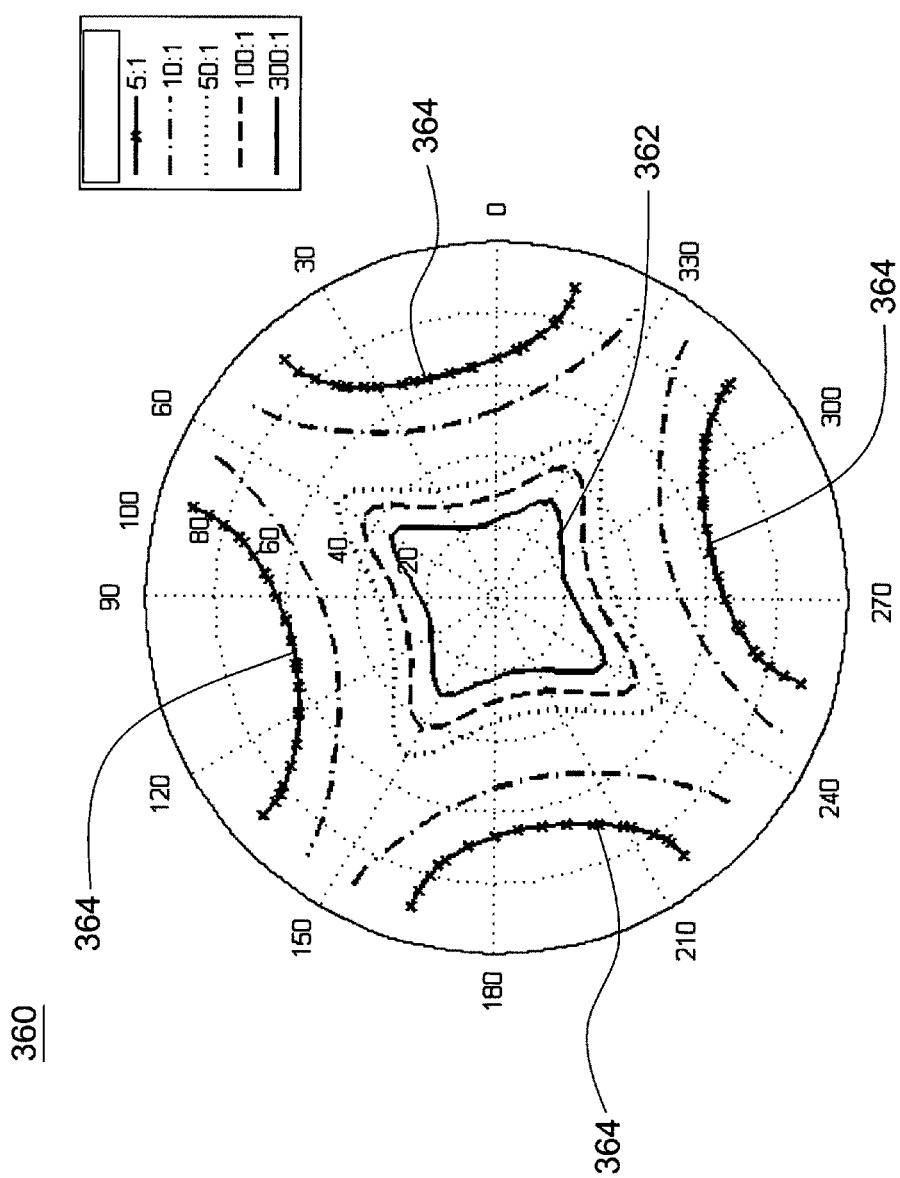

FIG. 29 is a simulated iso-contrast plot 360 for the T sub-pixel 116 of the pixel 330 of FIG. 26. An iso-contrast line 362 indicates that, for the T sub-pixel 116, a contrast ratio of 300:1 can be achieved within a ±20° viewing cone. Iso-contrast lines 364 indicate that a contrast ratio of 5:1 can be achieved within a ±60° viewing cone. This indicates that a display using the pixels 230 can have a wide view angle of about 120° with a contrast ratio of 5:1 when operating in the transmissive mode. Compensation films including the a-plates 162 and 166, and the c-plate 164 (FIG. 6) were used in the simulation for the plot 360.

Figure 30:
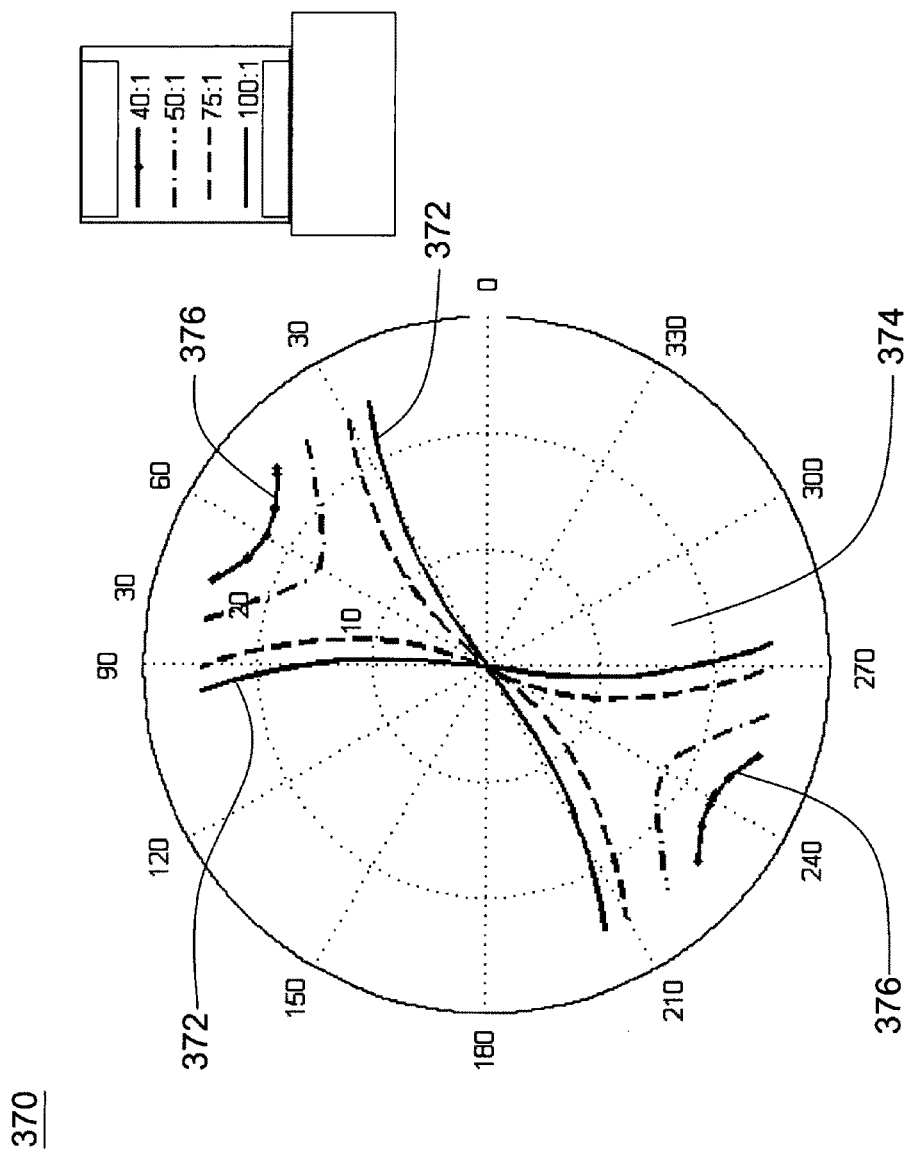

FIG. 30 is a simulated iso-contrast plot 370 for the R sub-pixel 114 of the pixel 330 of FIG. 26. Iso-contrast lines 372 indicate that a contrast ratio greater than 100:1 can be achieved for certain viewing directions 374. Iso-contrast lines indicate that a contrast ratio of 40:1 can be achieved within a ±23° viewing cone.

FIGS. 28 to 30 show that a transflective display using the pixels 330 of FIG. 26 can have a high light efficiency, a high contrast ratio, and a wide viewing angle in both transmissive and reflective modes. The pixel 330 does not show grayscale inversion in either the R sub-pixel 114 or the T sub-pixel 116 for pixel voltages between 0 to 5 $V_{RMS}$. The pixel 330 has a single cell gap and is easy to manufacture. The pixel 330 can be driven by a single TFT due to the close matching of the V-T curve 352 and V-R curve 354. A transflective display having the pixels 330 is useful in, e.g., portable electronic devices.

Example 6 of a Transflective Pixel

Figure 31:
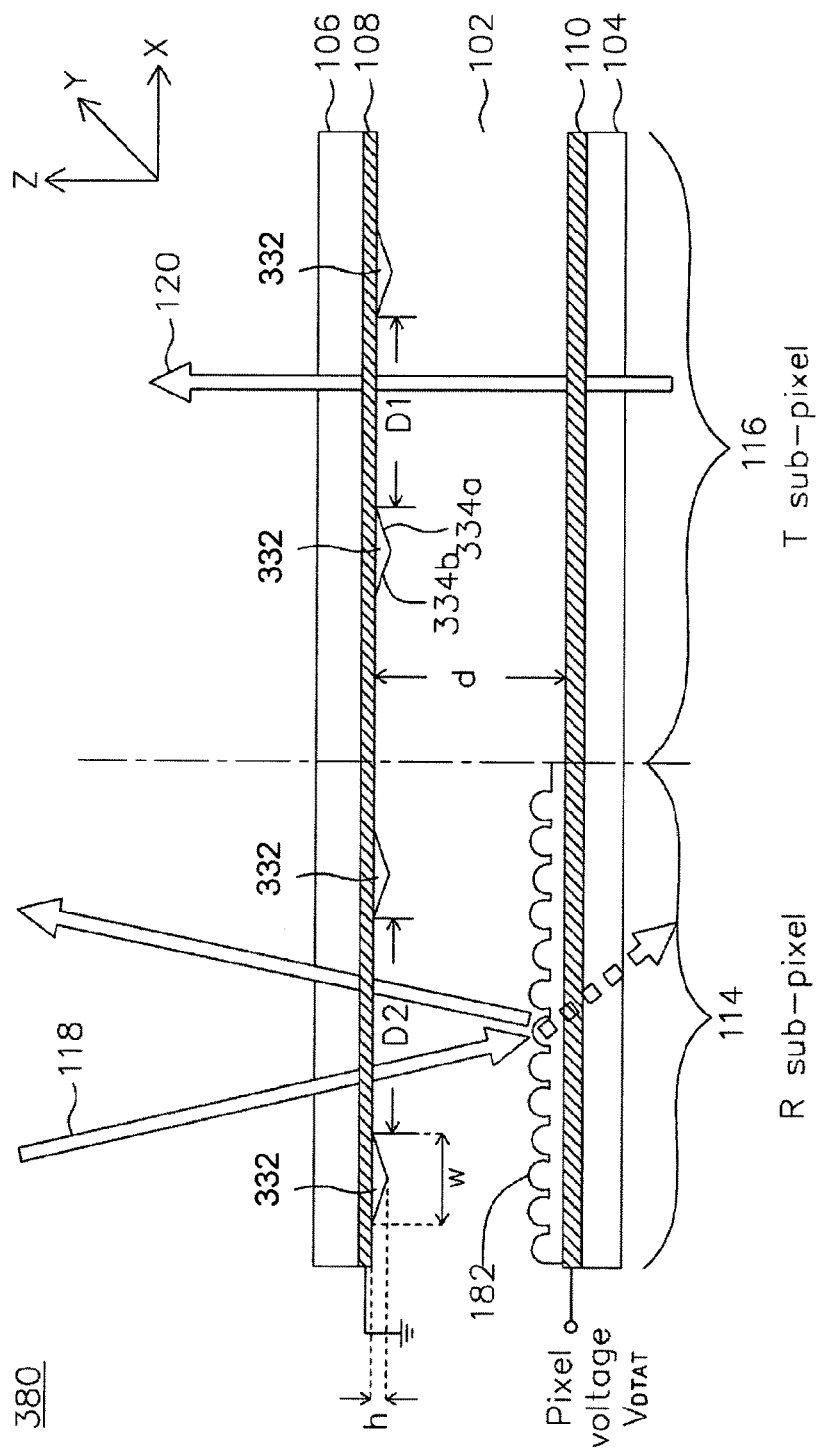

FIG. 31 is a cross sectional diagram of an example of a pixel 380 that is similar to the pixel 330 of FIG. 26, except that a transflective electrode 182 is used instead of the reflective electrode 112. The transflective electrode 182 of the pixel 380 is similar to the transflective electrode 182 of the pixel 180 (FIG. 9). The pixel 380 includes protrusions 332 that are similar to the protrusions 332 of the pixel 330 (FIG. 26). The reflective protrusion ratio ORr is about 33.3% and the transmissive protrusion ratio ORt is about 20%.

Figure 32:
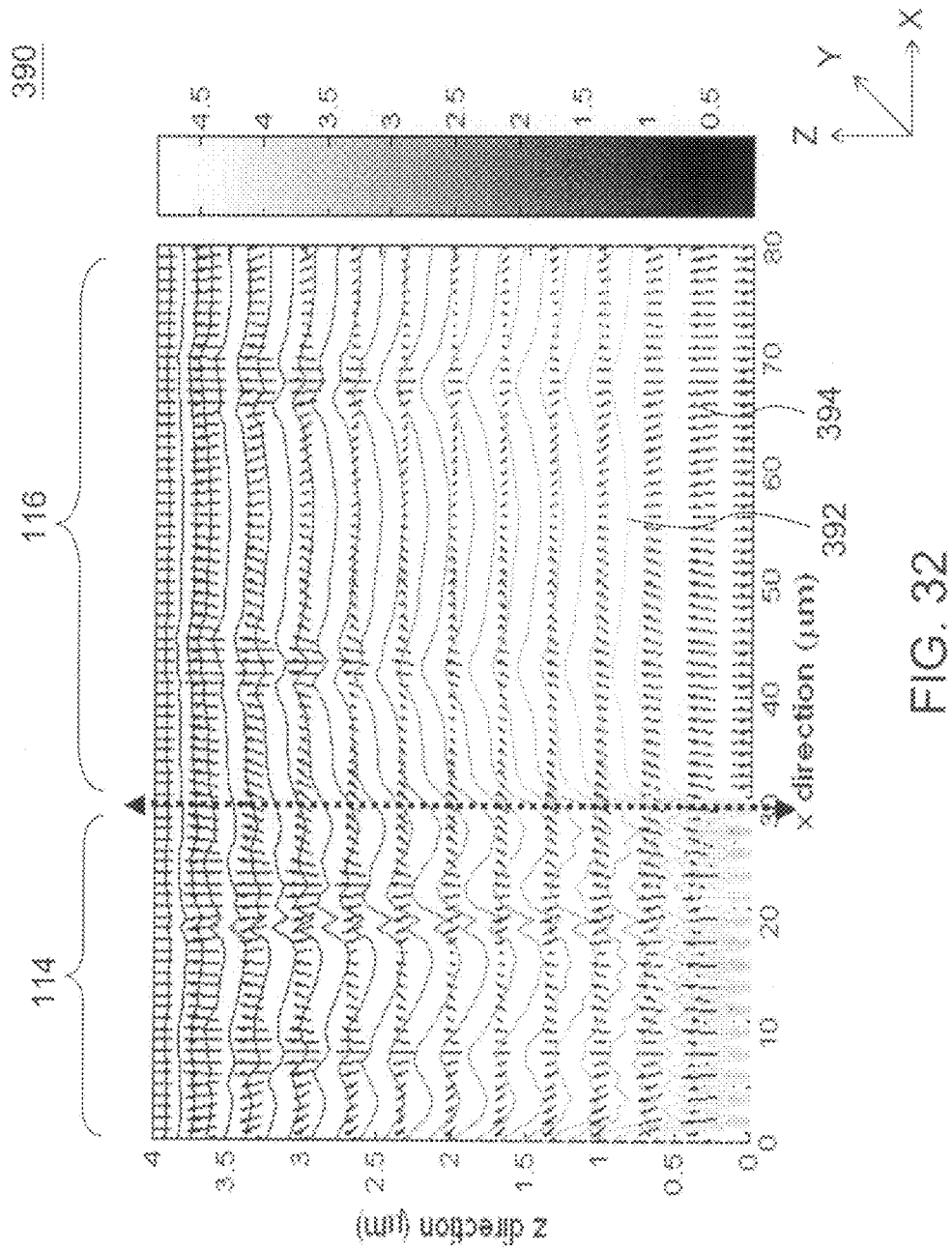

FIG. 32 is a graph 390 showing electric potential lines 392 in the liquid crystal layer 102 and a distribution of liquid crystal directors 394 on an X-Z plane along the center of the pixel 380 of FIG. 31. A pixel voltage $V_{DATA}$=5 $V_{RMS}$, which corresponds to a bright state or white color, is applied to the pixel electrode 110 and the transflective electrode 182 of the pixel 380. The graph 390 shows that, due to the effects of longitudinal electric fields and fringe electric fields in the R sub-pixel 114 and T sub-pixel 116, multiple domains are formed in the liquid crystal layer 102 in both the R sub-pixel 114 and T sub-pixel 116, allowing a display having pixels 380 to have a wide viewing angle.

Figure 33:
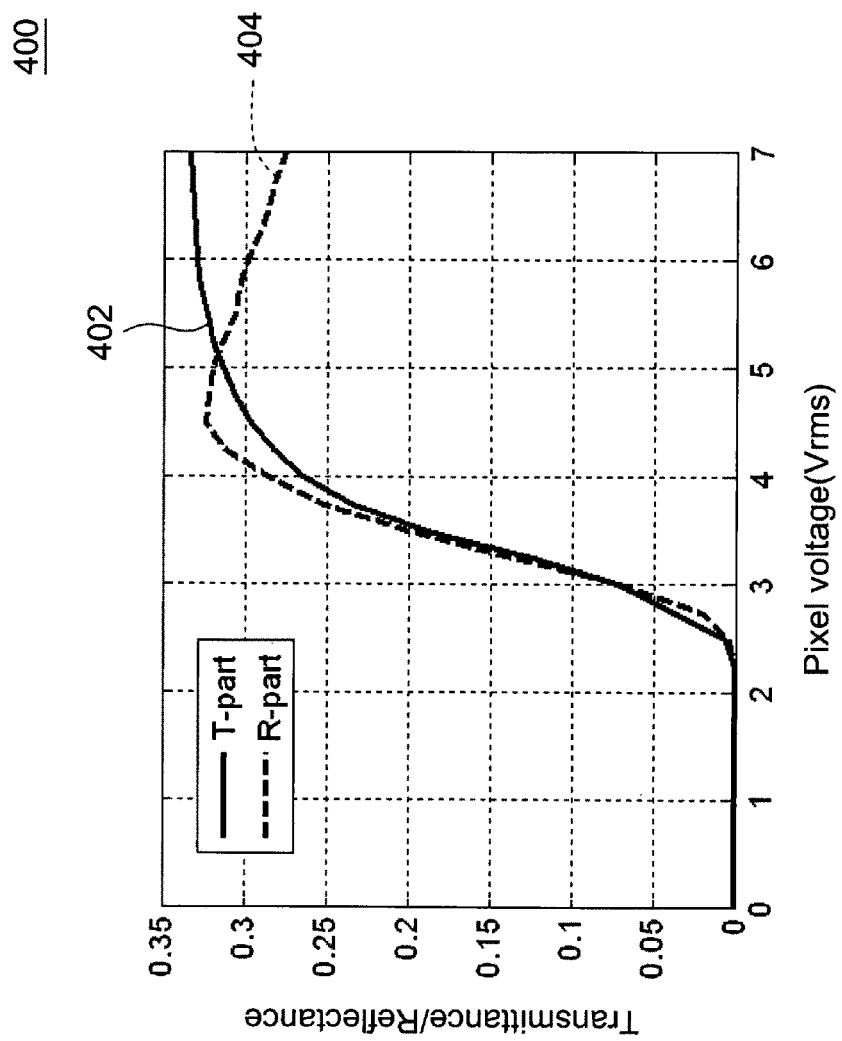

FIG. 33 is a graph 400 showing a voltage-dependent transmittance (V-T) curve 402 and a voltage-dependent reflectance (V-R) curve 404 of the pixel 380 of FIG. 31. The R sub-pixel 114 and the T sub-pixel 116 have almost the same threshold voltage $V_{TH}$=2.25 $V_{RMS}$. When the pixel voltage $V_{DATA}$ is below 5 $V_{RMS}$, the V-T curve 402 and the V-R curve 404 match more closely, as compared to a pixel having the reflective opening ratio equal to the transmissive opening ratio. Using Equ. 1 and assuming that pixel voltage V=225 $V_{RMS}$ corresponds to gray level 0 and V=5.0 $V_{RMS}$ corresponds to gray level 255, the RMS difference between the V-T curve 402 and the V-R curve 404 in FIG. 33 is about 1.5%. The matching between the V-T curve 402 and V-R curve 404 indicates that the transflective pixel 380 can be driven by a single thin film transistor while having a matched gamma curve between the R sub-pixel 114 and T sub-pixel 116.

When the pixel voltage, is 5 $V_{RMS}$, the transmittance is about 31.8%, and the reflectance is about 33.5%. The pair of broadband circular polarizers 91 and 95 has a maximum transmittance of 35%. Thus, the pixel 180 has a high optical efficiency of 89.6% and 91.2% for the transmissive mode and the reflective mode, respectively, at 5 $V_{RMS}$ when normalized to the transmittance of the circular polarizers 91 and 95.

Figure 34:
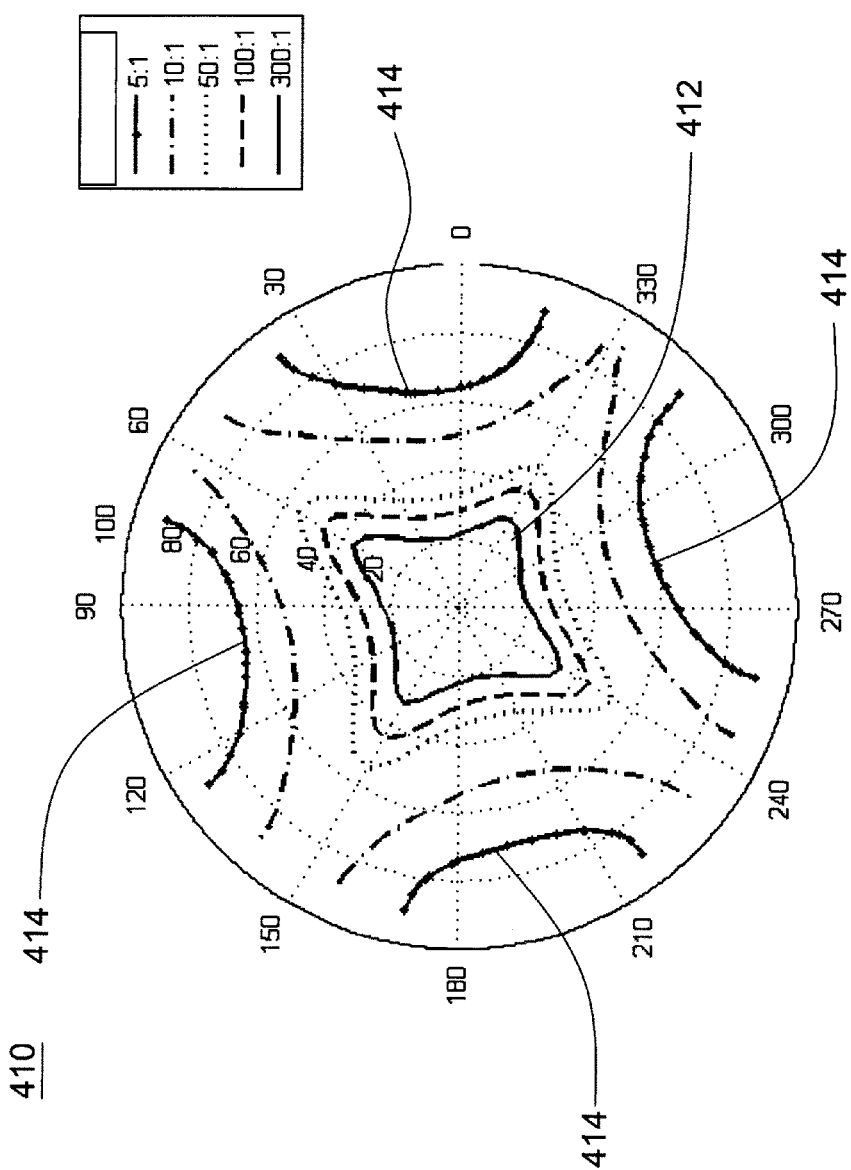

FIG. 34 is a simulated iso-contrast plot 410 for the T sub-pixel 116 of the pixel 380 (FIG. 31). An iso-contrast line 412 indicates that, for the T sub-pixel 116, a contrast ratio of 300:1 can be achieved within a ±20° viewing cone. Iso-contrast lines 414 indicate that a contrast ratio of 5:1 can be achieved within a ±60° viewing cone. This indicates that a display using the pixels 380 can have a wide view angle of about 120° with a contrast ratio of 5:1 when operating in the transmissive mode.

Figure 35:
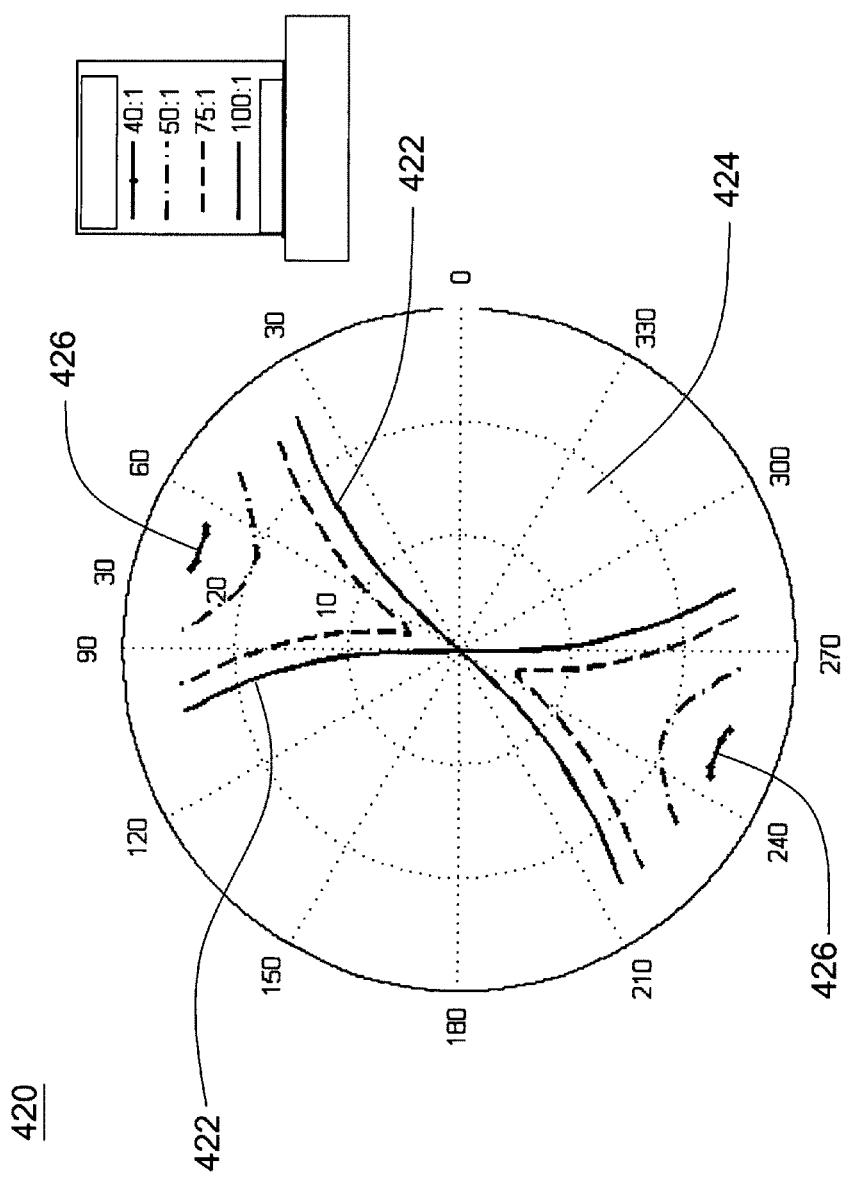

FIG. 35 is a simulated iso-contrast plot 420 for the R sub-pixel 114 of the pixel 380 (FIG. 31). Iso-contrast lines 422 indicate that a contrast ratio greater than 100:1 can be achieved for certain viewing directions 424. Iso-contrast lines 426 indicates that a contrast ratio of 40:1 can be achieved within a ±30° viewing cone.

FIGS. 33 to 35 show that a transflective display having the pixels 380 of FIG. 31 can have a high light efficiency, a high contrast ratio, and a wide viewing angle in both transmissive and reflective modes. The pixel 380 does not show grayscale inversion in either the R sub-pixel 114 or the T sub-pixel 116 for pixel voltages between 0 to 5 $V_{RMS}$. The pixel 380 has a single cell gap and is easy to manufacture. The pixel 380 can be driven by a single TFT due to the close matching of the V-T curve 402 and V-R curve 404. A transflective display having the pixels 380 is useful in, e.g., portable electronic devices.

System Diagram

Figure 36:
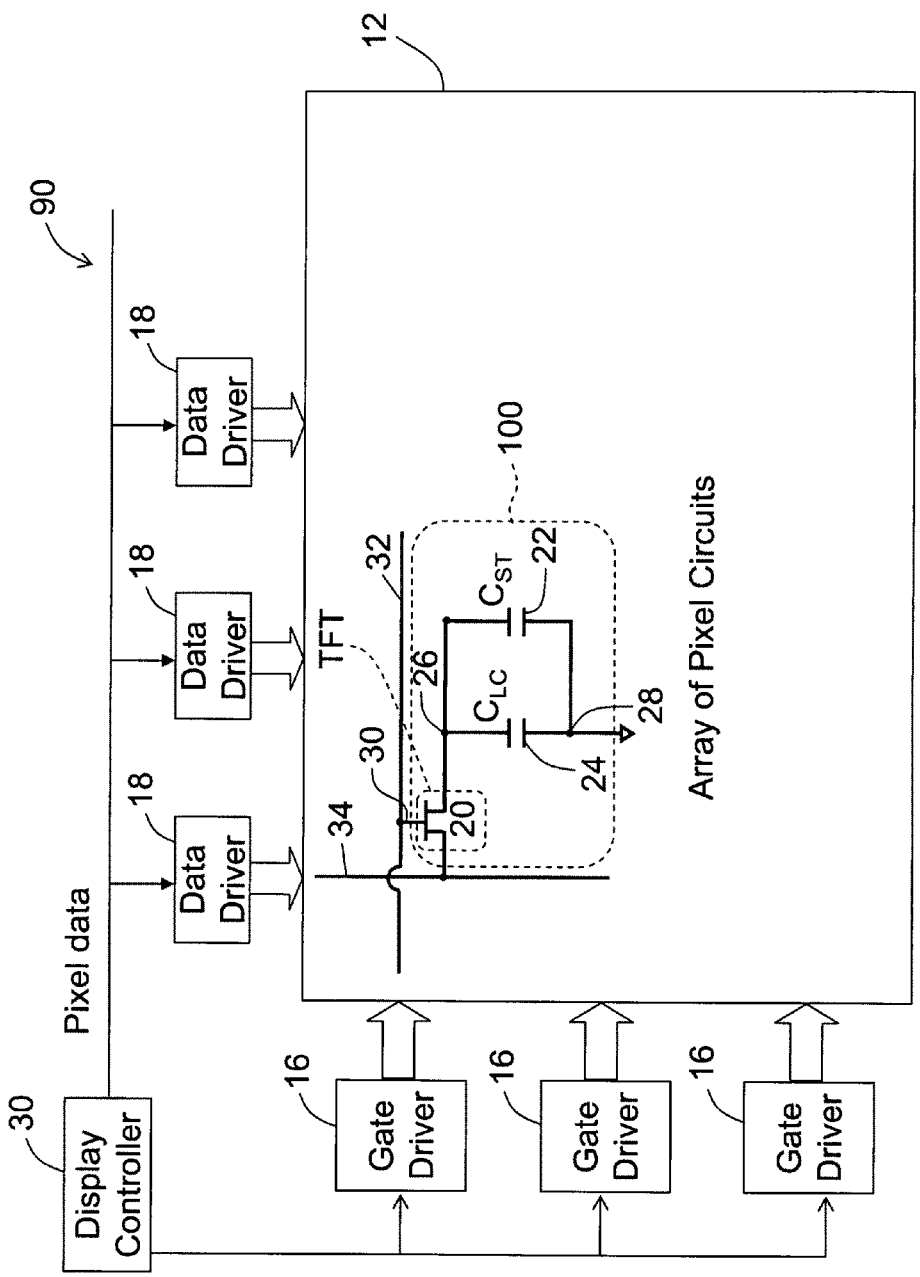
FIG. 36 is a schematic diagram of a control circuitry for a liquid crystal display.

FIG. 36 is a schematic diagram of an example control circuitry for the liquid crystal display 90. An array 12 of pixels 100 are controlled by one or more gate drivers 16 and one or more data drivers 18. Each pixel 100 includes one or more thin film transistors (TFT) 20, a storage capacitor $C_{ST}$ 22, and a liquid crystal layer 102 that has an effective capacitance represented by a capacitor $C_{LC}$ 24. The capacitors $C_{ST}$ 22 and $C_{LC}$ 24 can be, e.g., connected in parallel to a first node 26 and a second node 28. The TFT 20 includes a gate 30 that is connected to a gate line 32, which is connected to the gate driver 16. When the gate driver 16 drives the gate line 32 to turn on the TFT 20, the data driver 18 drives a data line 34 with a voltage signal (e.g., $V_{DATA}$) that is passed to the capacitors $C_{ST}$ 22 and $C_{LC}$ 24.

In some examples, the first node 26 is connected to the pixel electrode 110 and the reflective pixel 112 (FIG. 2), and the second node 28 is connected to the common electrode 108. The voltage (e.g., $V_{DATA}$) across the capacitor $C_{ST}$ 22 determines the voltage applied to the liquid crystal layer 102. The voltage on the data line 34 is referred to as a pixel voltage or a gray scale voltage because it determines the gray scale level shown by the pixel 100.

ALTERNATIVE EXAMPLES

Other implementations and applications are also within the scope of the following claims. For example, in FIG. 36, the pixels 100 can be replaced by other types of pixels, such as pixel 160 of FIG. 6, pixel 180 of FIG. 9, pixel 230 of FIG. 14, pixel 280 of FIG. 20, pixel 330 of FIG. 26, and pixel 380 of FIG. 31. Additional layers can be used in the displays described above. The components of the displays, such as the liquid crystal layer, the polarization films, and the compensation films, can use materials and have parameters different from those described above. The liquid crystal layer may include chiral dopants to improve characteristics of the display. The retardation values d·Δn of the films can be different from those described above. In some examples, a negative c-plate without a-plates can be used, as a compensation film. The common electrode 108 does not necessarily have to be connected to a ground reference voltage. When the display is operating in the transmissive mode in which the backlight module 82 is turned on, some ambient light 118 may be reflected by the reflective electrode 112 (or transflective electrode 182), so the display can operate in both the transmissive and reflective modes at the same time.

The orientations of the liquid crystal molecules described above refer to the directions of directors of the liquid crystal molecules. The molecules do not necessarily all point to the same direction all the time. The molecules may tend to point more in one direction (represented by the director) over time than other directions. For example, the phrase "the liquid crystal molecules are substantially aligned along a direction normal to the substrates" means that the average direction of the directors of the liquid crystal molecules is generally aligned along the normal direction, but the individual molecules may point to different directions.

What is claimed is:

1. An apparatus comprising:
display pixels each comprising a reflective (R) sub-pixel, a transmissive (T) sub-pixel, and electrodes having features to cause multiple domains to form in a liquid crystal layer of the R sub-pixel and the T sub-pixel, the electrodes in the R sub-pixels having features that are different from features of the electrodes in the T sub-pixel to cause the liquid crystal layer in the R sub-pixel to have an optical phase retardation that is between 20% to 80% of an optical phase retardation of the liquid crystal layer in the T sub-pixel, the R sub-pixel and the T sub-pixel have a same cell gap and being driven by a same pixel voltage.

2. The apparatus of claim 1 wherein the features comprise at least one of openings and protrusions.

3. The apparatus of claim 1 wherein the features comprise elongated slits.

4. The apparatus of claim 1 wherein the features comprise one or more openings that are formed on a common electrode of the R sub-pixel and one or more openings that are formed on a common electrode of the T sub-pixel.

5. The apparatus of claim 1 wherein the features comprise one or more openings formed on a reflective electrode of the R sub-pixel and one or more openings formed on a pixel electrode of the T sub-pixel.

6. The apparatus of claim 1 wherein the features comprise one or more openings in at least one electrode of the R sub-pixel and one or more openings in at least one electrode of the T sub-pixel, the openings in the R sub-pixel having an area that is of a first percentage of an area of the R sub-pixel, the openings in the T sub-pixel have an area that is of a second percentage of an area of the T sub-pixel, and the first percentage is greater than the second percentage.

7. The apparatus of claim 1 wherein the features comprise protrusions having triangular-shaped cross sections.

8. The apparatus of claim 1 wherein the features comprise one or more protrusions in at least one electrode of the R sub-pixel and one or more protrusions in at least one electrode of the T sub-pixel, the one or more protrusions in the R sub-pixel having a base area that is of a first percentage of an area of the R sub-pixel, the one or more protrusions in the T sub-pixel have a base area that is of a second percentage of an area of the T sub-pixel, and the first percentage is greater than the second percentage.

9. The apparatus of claim 1 wherein the liquid crystal layer in the R sub-pixel has an optical phase retardation that is between 40% to 60% of the optical phase retardation of the liquid crystal layer in the T sub-pixel.

10. The apparatus of claim 9 wherein ambient light passes the liquid crystal layer of the R sub-pixel twice, and backlight passes the liquid crystal layer in the T sub-pixel once, such that the phase retardation imparted to the ambient light is 80% to 120% of the phase retardation imparted to the backlight.

11. The apparatus of claim 1 wherein ambient light passes the liquid crystal layer of the R sub-pixel twice, and backlight passes the liquid crystal layer in the T sub-pixel once, such that the phase retardation imparted to the ambient light is 40% to 160% of the phase retardation imparted to the backlight.

12. A transflective display comprising:
pixels each comprising
a reflective (R) sub-pixel having a liquid crystal layer between a common electrode and an at least partially reflective electrode, at least one of the common electrode and the at least partially reflective electrode having first features to cause multiple domains to be formed in the liquid crystal layer of the R sub-pixel when a voltage is applied to the common electrode and the at least partially reflective electrode; and
a transmissive (T) sub-pixel having a liquid crystal layer between a common electrode and a transparent electrode, at least one of the common electrode and the transparent electrode having second features to cause multiple domains to be formed in the liquid crystal layer of the T sub-pixel when the voltage is applied to the common electrode and the transparent electrode;
wherein the first and second features affect electric field distributions in the R and T sub-pixels to cause the liquid crystal layer in the R sub-pixel to have an optical phase retardation that is between 20% to 80% of an optical phase retardation of the liquid crystal layer in the T sub-pixel.

13. The display of claim 12 wherein each of the first features and the second features comprise at least one of openings and protrusions.

14. The display of claim 12 wherein the first and second features comprise openings, the openings in the R sub-pixel have an area that is of a first percentage of an area of the R sub-pixel, the openings in the T sub-pixel have an area that is of a second percentage of an area of the T sub-pixel, and the first percentage is greater than the second percentage.

15. The display of claim 12 wherein the first and second features comprise openings, and at least one opening comprises an elongated slit.

16. The display of claim 12 wherein each of the common electrode and the at least partially reflective electrode of the R sub-pixel has an opening.

17. The display of claim 12 wherein each of the common electrode and the transparent electrode of the T sub-pixel has an opening.

18. The display of claim 12 wherein the at least partially reflective electrode of the R sub-pixel is electrically connected to the transparent electrode of the T sub-pixel.

19. The display of claim 12 wherein the at least partially reflective electrode comprises a transflective electrode having a reflectance greater than 30% and a transmittance greater than 30%.

20. The display of claim 19 wherein the transflective electrode comprises a metal grating having periodically spaced apart metal ribs.

21. The display of claim 12, further comprising a circular polarizer.

22. The display of claim 12, further comprising:
a first circular polarizer between the liquid crystal layer and a backlight module;
a second circular polarizer, the liquid crystal layer being between the first and second circular polarizers;
a first a-plate compensation film between the first circular polarizer and the liquid crystal layer;
a second a-plate compensation film between the second circular polarizer and the liquid crystal layer; and
a c-plate compensation film between the second a-plate and the liquid crystal layer.

23. The display of claim 12 wherein the liquid crystal layer of the R sub-pixel has a cell gap that is the same as a cell gap of the liquid crystal layer of the T sub-pixel.

24. An apparatus comprising
display pixels each comprising
reflecting and transmitting sub-pixels having substantially the same cell gap and having respective different driving electrode features that impart matching voltage-transmission and voltage-reflectance characteristics to the sub-pixels to permit a single gray-scale gamma curve to be used to drive the pixel in both a transmissive mode and a reflective mode, the different driving electrode features comprising at least one of different opening ratios and different protrusion ratios.

25. An apparatus comprising:
display pixels each comprising
a reflective (R) sub-pixel and a transmissive (T) sub-pixel and electrodes having features to cause multiple domains to form in a liquid crystal layer of each of the R and T sub-pixels, the features of electrodes of the R sub-pixel being different from the features of electrodes of the T sub-pixel to cause longitudinal electric fields and fringe electric fields to form in the R and T sub-pixels such that the R sub-pixel has a higher percentage of regions with fringe electric fields than that of the T sub-pixel.

26. The apparatus of claim 25 wherein the features comprises at least one of openings and protrusions.

27. A method of operating a display comprising:
driving a reflective (R) sub-pixel and a transmissive (T) sub-pixel of a pixel of a liquid crystal display using a common pixel voltage, the R sub-pixel and the T sub-pixel each having a liquid crystal layer, the R and T sub-pixels having a same cell gap;
generating a first electric field in the R sub-pixel to cause multiple domains to be formed in the liquid crystal layer of the R sub-pixel; and
generating a second electric field in the T sub-pixel to cause multiple domains to be formed in the liquid crystal layer of the T sub-pixel, the first electric field having a distribution that is different from that of the second electric field to cause the liquid crystal layer in the R sub-pixel to have an optical phase retardation that is between 20% to 80% of an optical phase retardation of the liquid crystal layer in the T sub-pixel.

28. A method comprising:
generating a first electric field in a liquid crystal layer of a reflective (R) sub-pixel of a pixel of a display, the first electric field having a longitudinal field portion and a fringe field portion;
forming multiple domains in the liquid crystal layer of the R sub-pixel based on the longitudinal and fringe field portions of the first electric field to cause the liquid crystal layer of the R sub-pixel to have a first optical phase retardation;

generating a second electric field in a liquid crystal layer of a transmissive (T) sub-pixel of the pixel, the second electric field having a longitudinal field portion and a fringe field portion; and forming multiple domains in the liquid crystal layer of the T sub-pixel based on the longitudinal and fringe field portions of the second electric field to cause the liquid crystal layer of the T sub-pixel to have a second optical phase retardation such that the first optical phase retardation is between 20% to 80% of the second optical phase retardation.

29. The method of claim 28, further comprising imparting a phase retardation of $\lambda/2$ to ambient light modulated by the R sub-pixel when the ambient light passes the liquid crystal layer of the R sub-pixel twice.

30. The method of claim 28, further comprising imparting a phase retardation of $\lambda/2$ to backlight modulated by the T sub-pixel when the backlight passes the liquid crystal layer of the T sub-pixel once.

31. The method of claim 28, further comprising passing back light through a first circular polarizer, a first a-plate compensation film, the liquid crystal layer of the T sub-pixel, a c-plate compensation film, a second a-plate compensation film, and a second circular polarizer in sequence.

* * * * *